United States Patent
You

(10) Patent No.: US 12,427,718 B2
(45) Date of Patent: *Sep. 30, 2025

(54) THREE-DIMENSIONAL BIOPRINTER HAVING MULTI-SYRINGE OUTPUT MODULE

(71) Applicant: ROKIT HEALTHCARE INC., Seoul (KR)

(72) Inventor: Seok Hwan You, Seoul (KR)

(73) Assignee: ROKIT HEALTHCARE INC., Seoul (KR)

( * ) Notice: Subject to any disclaimer, the term of this patent is extended or adjusted under 35 U.S.C. 154(b) by 663 days.

This patent is subject to a terminal disclaimer.

(21) Appl. No.: 17/426,819

(22) PCT Filed: Oct. 29, 2019

(86) PCT No.: PCT/KR2019/014335
§ 371 (c)(1),
(2) Date: Apr. 28, 2022

(87) PCT Pub. No.: WO2021/071007
PCT Pub. Date: Apr. 15, 2021

(65) Prior Publication Data
US 2022/0258419 A1 Aug. 18, 2022

(30) Foreign Application Priority Data
Oct. 8, 2019 (KR) .......................... 10-2019-0124573

(51) Int. Cl.
*B29C 64/209* (2017.01)
*B29C 64/232* (2017.01)
(Continued)

(52) U.S. Cl.
CPC .......... *B29C 64/209* (2017.08); *B29C 64/232* (2017.08); *B29C 64/241* (2017.08);
(Continued)

(58) Field of Classification Search
CPC ..... B29C 31/06; B29C 47/0002; B29C 47/56; B29C 67/0055; B29C 2947/92704;
(Continued)

(56) References Cited

U.S. PATENT DOCUMENTS

| 9,073,366 B1 | 7/2015 | Din et al. |
| 2016/0023467 A1* | 1/2016 | Din .................... B41J 2/16535 347/33 |
| 2018/0281280 A1 | 10/2018 | Solorzano et al. |

FOREIGN PATENT DOCUMENTS

| CN | 104224405 A | 12/2014 |
| CN | 206614795 U | 11/2017 |

(Continued)

OTHER PUBLICATIONS

International Search Report issued in International Application No. PCT/KR2019/014335 dated Jul. 8, 2020 (2 pages).
(Continued)

*Primary Examiner* — Armand Melendez
(74) *Attorney, Agent, or Firm* — Osha Bergman Watanabe & Burton LLP

(57) ABSTRACT

The disclosure is a three-dimensional bioprinter including a multi-syringe printing module. The multi-syringe printing module includes a packing plated installed inside a hollow cylinder portion and configured to separate an inside of the cylinder portion into a upper zone and a lower zone, a rotary shaft for rotating the packing plate, a plurality of syringe holders disposed below the packing plate and configured to hold each syringe, a syringe holder support portion configured to support the syringe holder; and a rotary shaft driving unit for rotating the rotary shaft. The syringe holder holding the syringe selected for printing is rotated to an output position by the rotation of the rotary shaft by the rotary shaft driving unit. A lift up/lift down unit having a vertical
(Continued)

movement unit disposed outside the printing chamber is provided to control lift up/lift down of the syringe printing module.

11 Claims, 16 Drawing Sheets

(51) Int. Cl.
    *B29C 64/241*    (2017.01)
    *B29C 64/245*    (2017.01)
    *B29C 64/25*     (2017.01)
    *B29C 64/295*    (2017.01)
    *B33Y 30/00*     (2015.01)

(52) U.S. Cl.
    CPC ............ *B29C 64/245* (2017.08); *B29C 64/25* (2017.08); *B29C 64/295* (2017.08); *B33Y 30/00* (2014.12)

(58) Field of Classification Search
    CPC ... B29C 47/0071; B29C 47/92; B29C 47/025; B29C 2037/903; B33Y 40/00; B33Y 50/02
    USPC .................................. 700/242; 264/517, 34
    See application file for complete search history.

(56) References Cited

FOREIGN PATENT DOCUMENTS

| | | |
|---|---|---|
| KR | 101828345 B1 | 3/2018 |
| WO | 2015120538 A1 | 8/2015 |

OTHER PUBLICATIONS

Written Opinion issued in International Application No. PCT/KR2019/014335 dated Jul. 8, 2020 (3 pages).

\* cited by examiner

[Fig. 1]
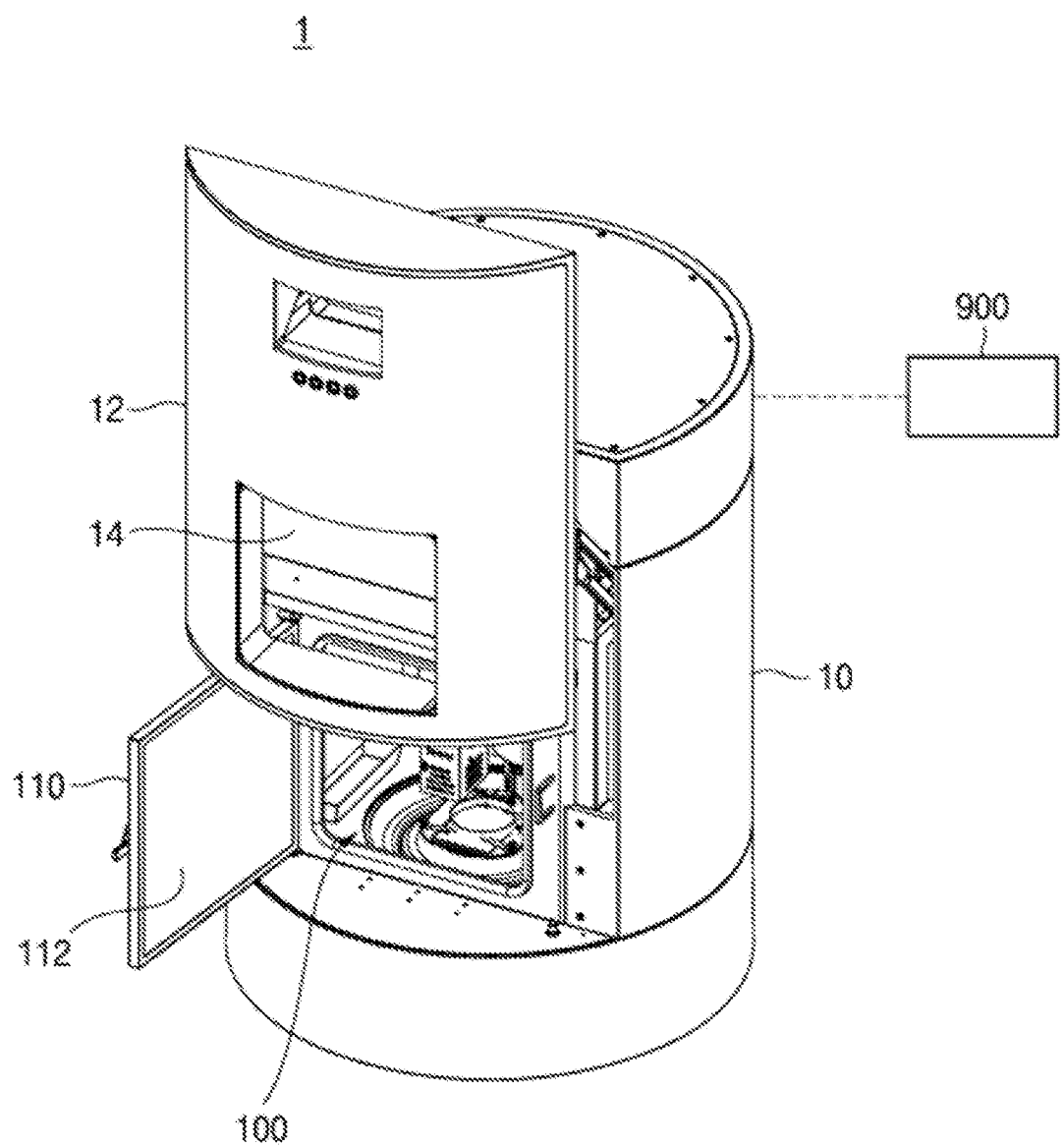

[Fig. 2]
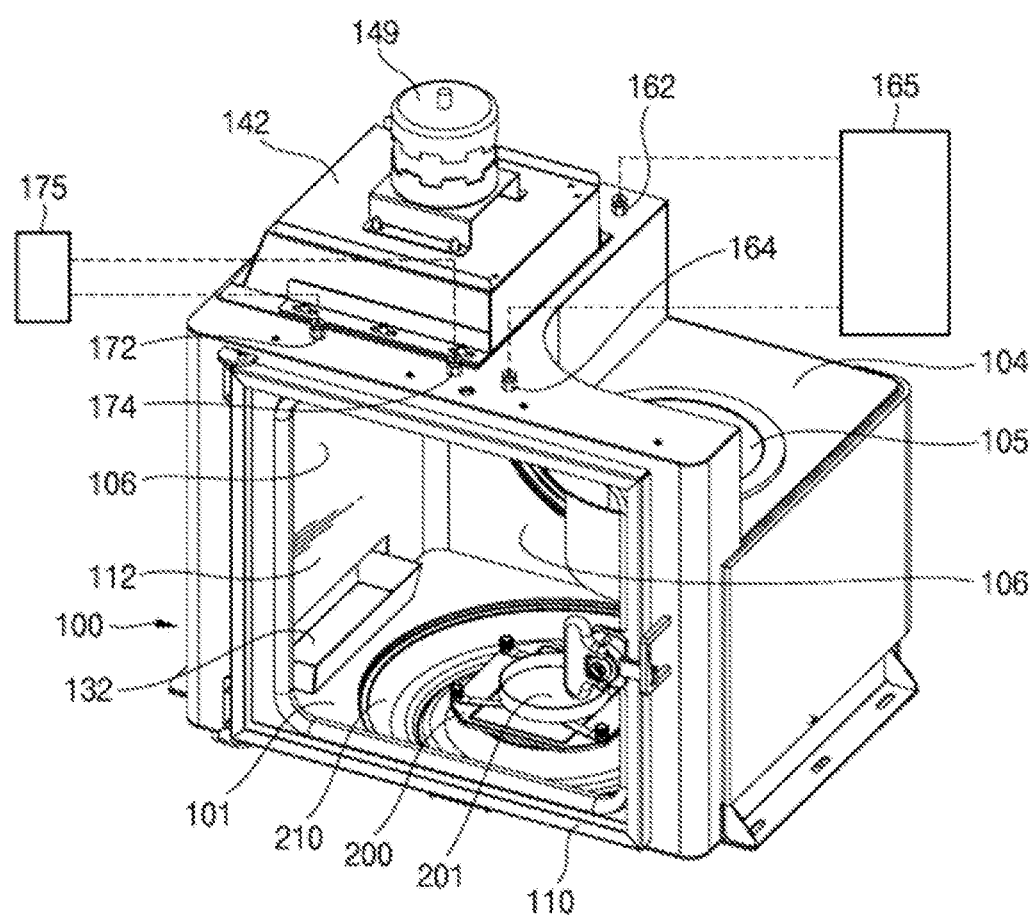

[Fig. 3]
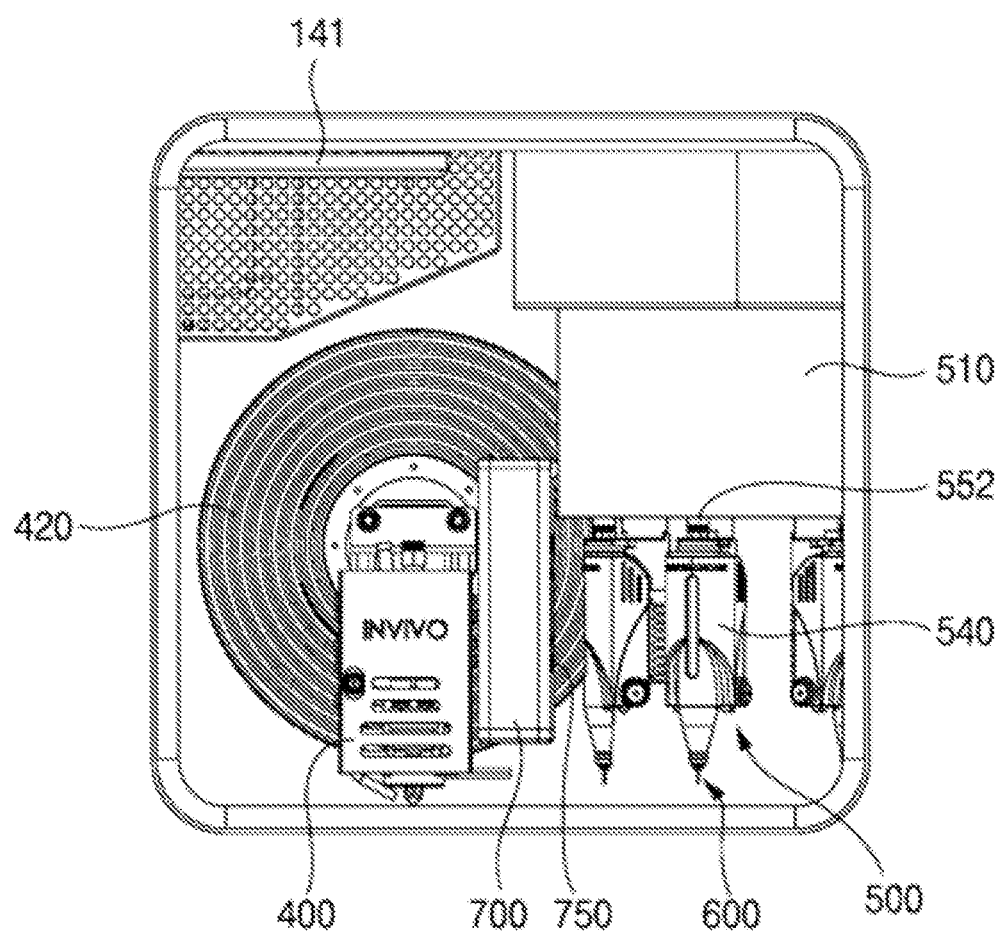

[Fig. 4]
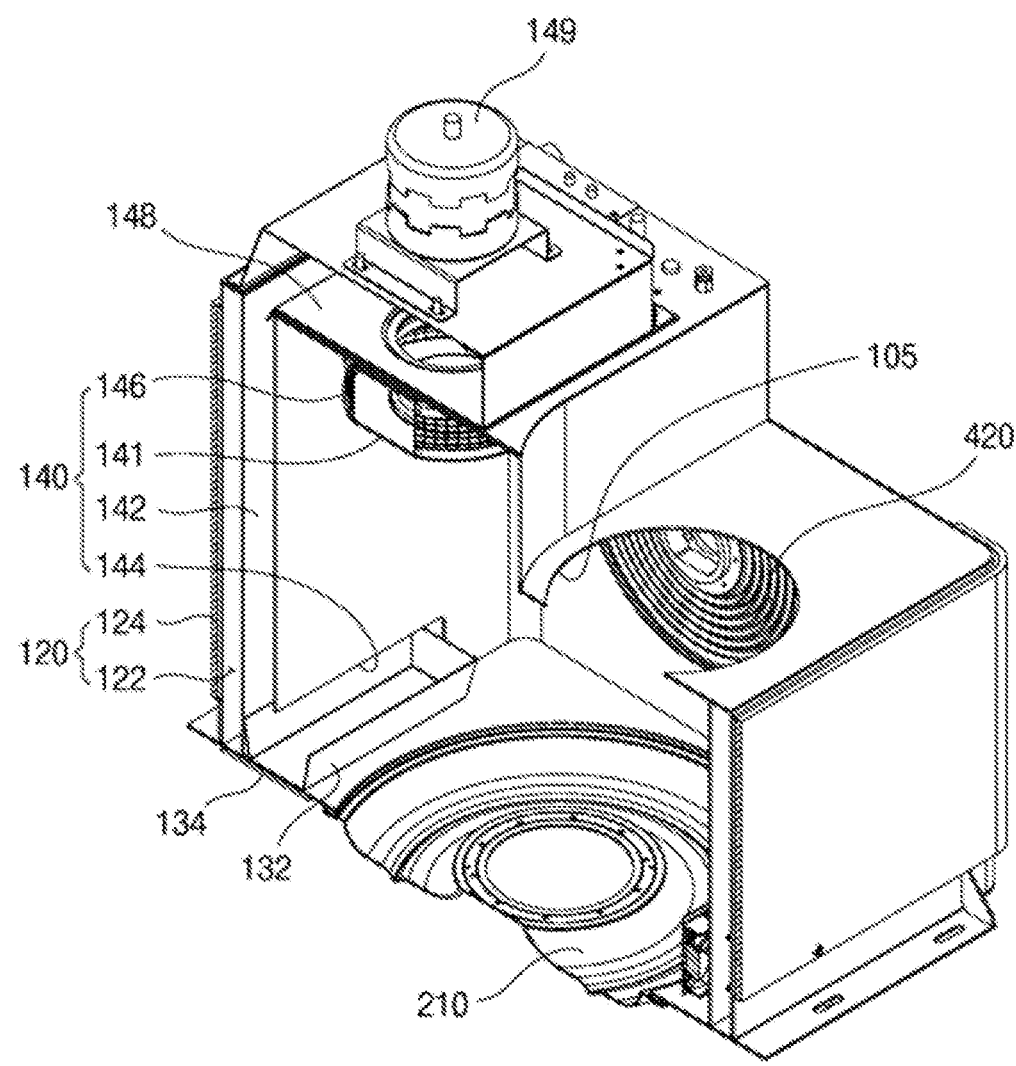

[Fig. 5]
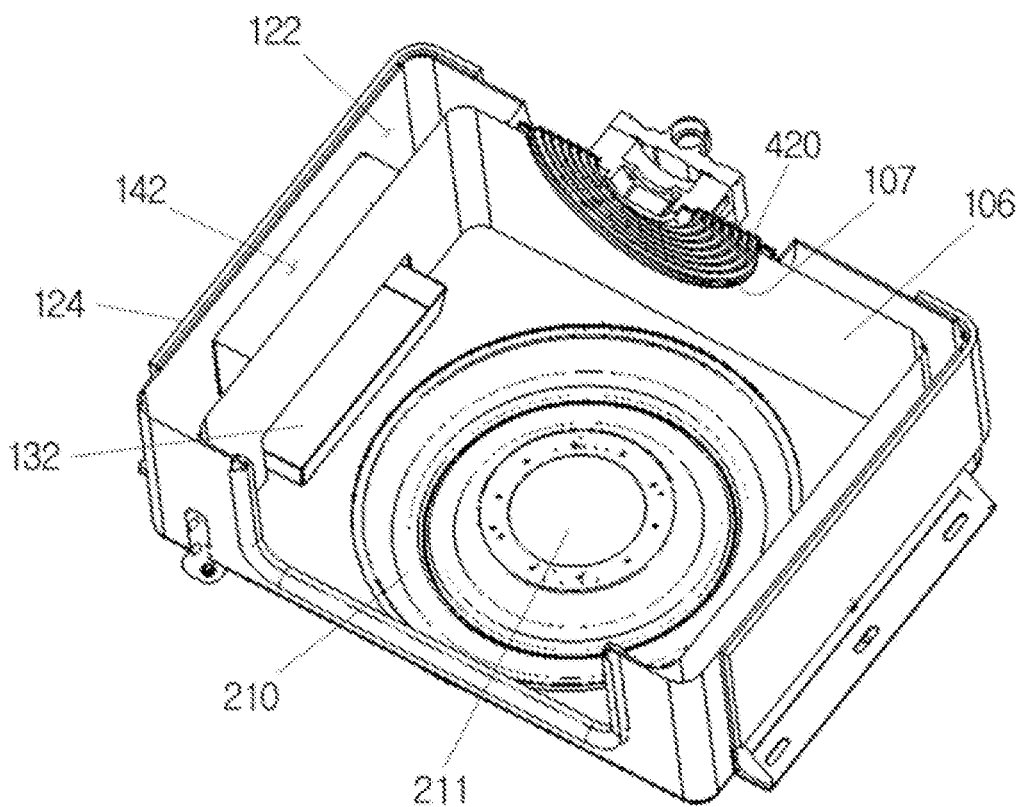

[Fig. 6]
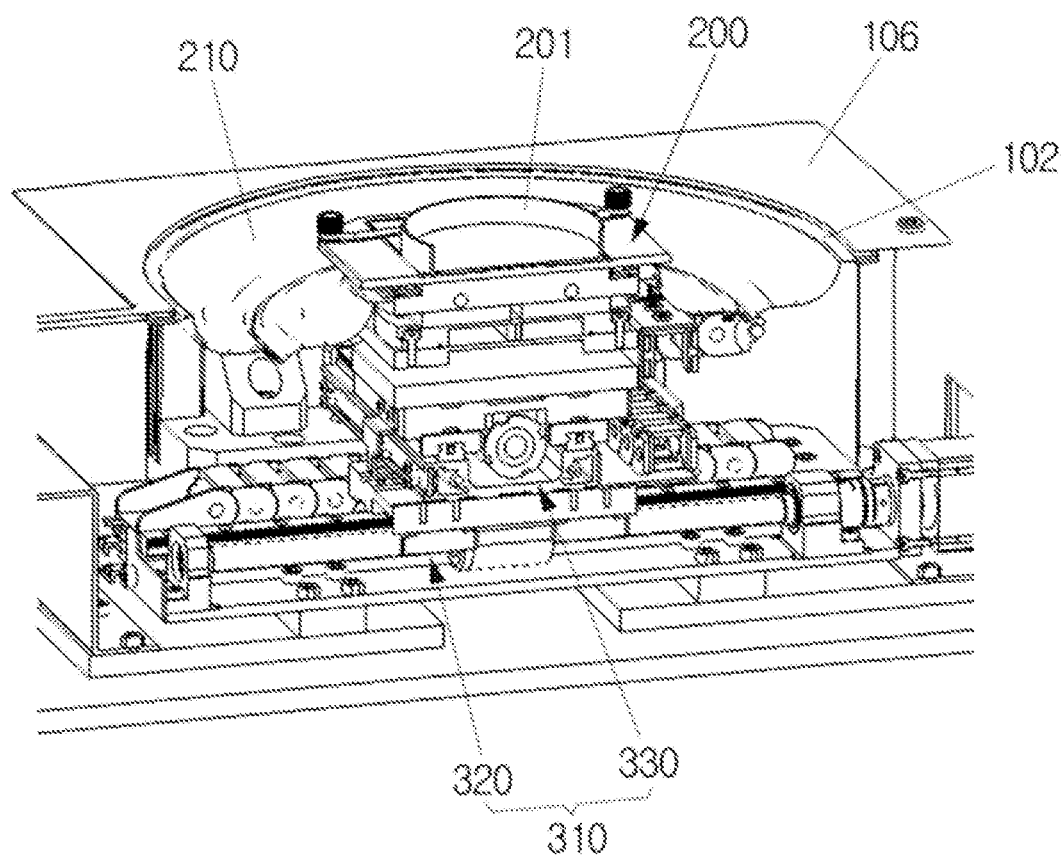

[Fig. 7]
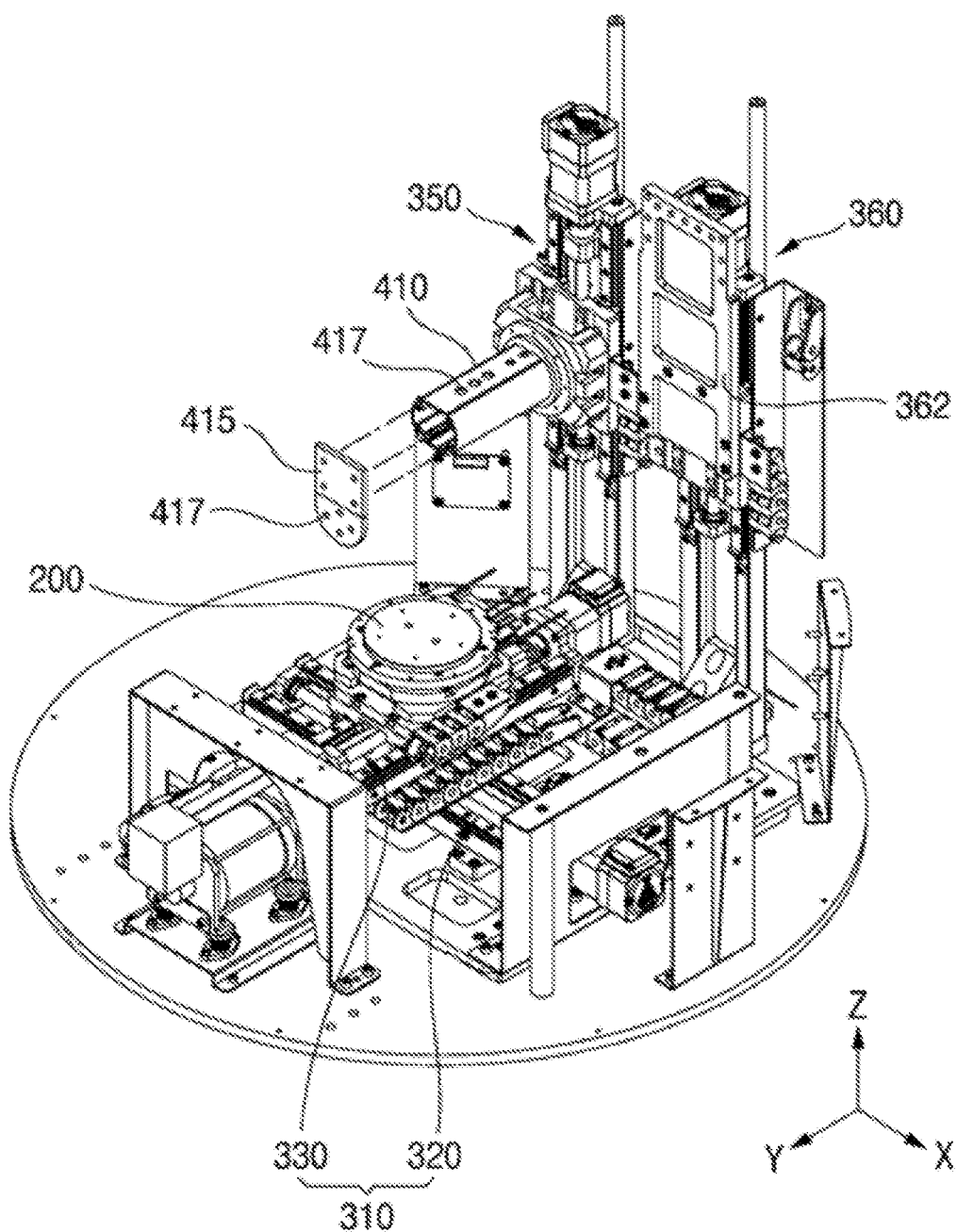

[Fig. 8]
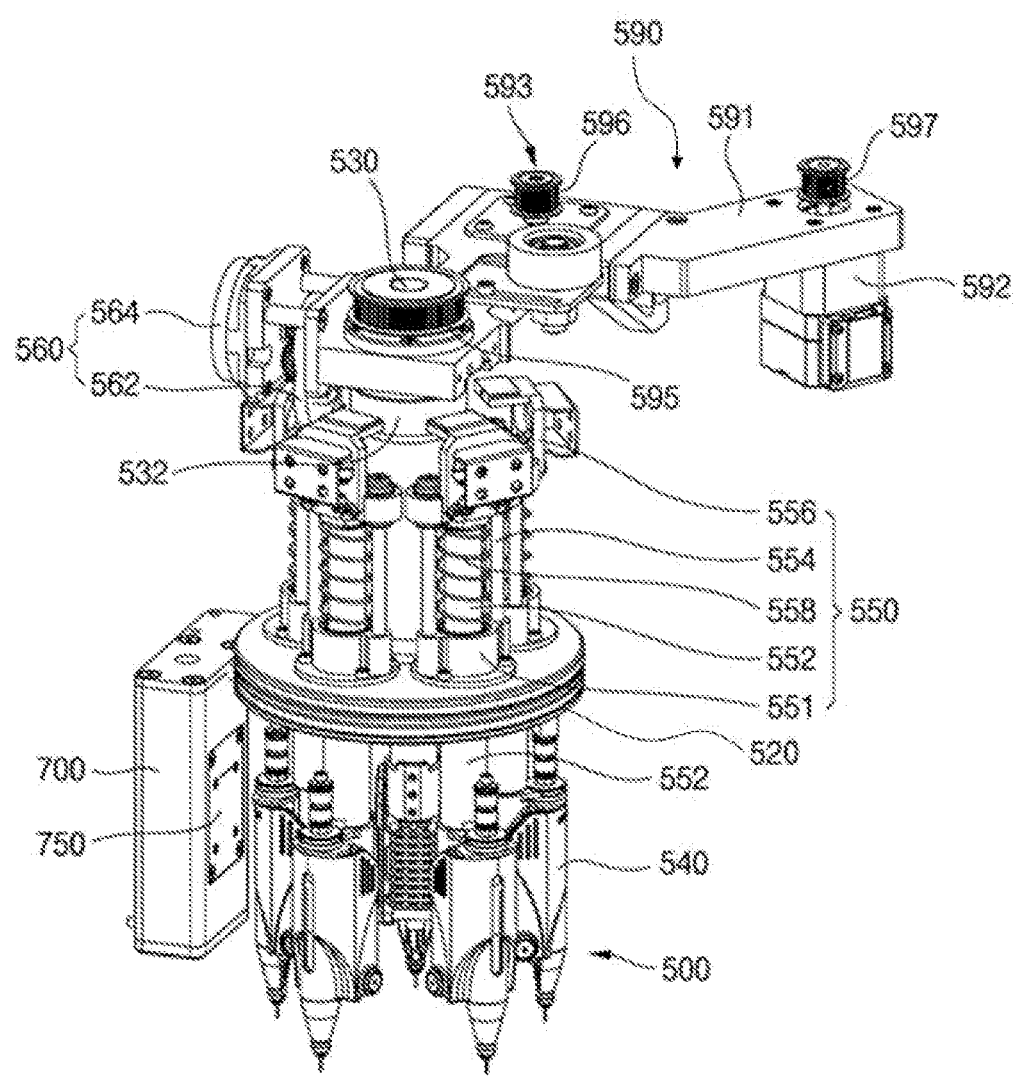

[Fig. 9]
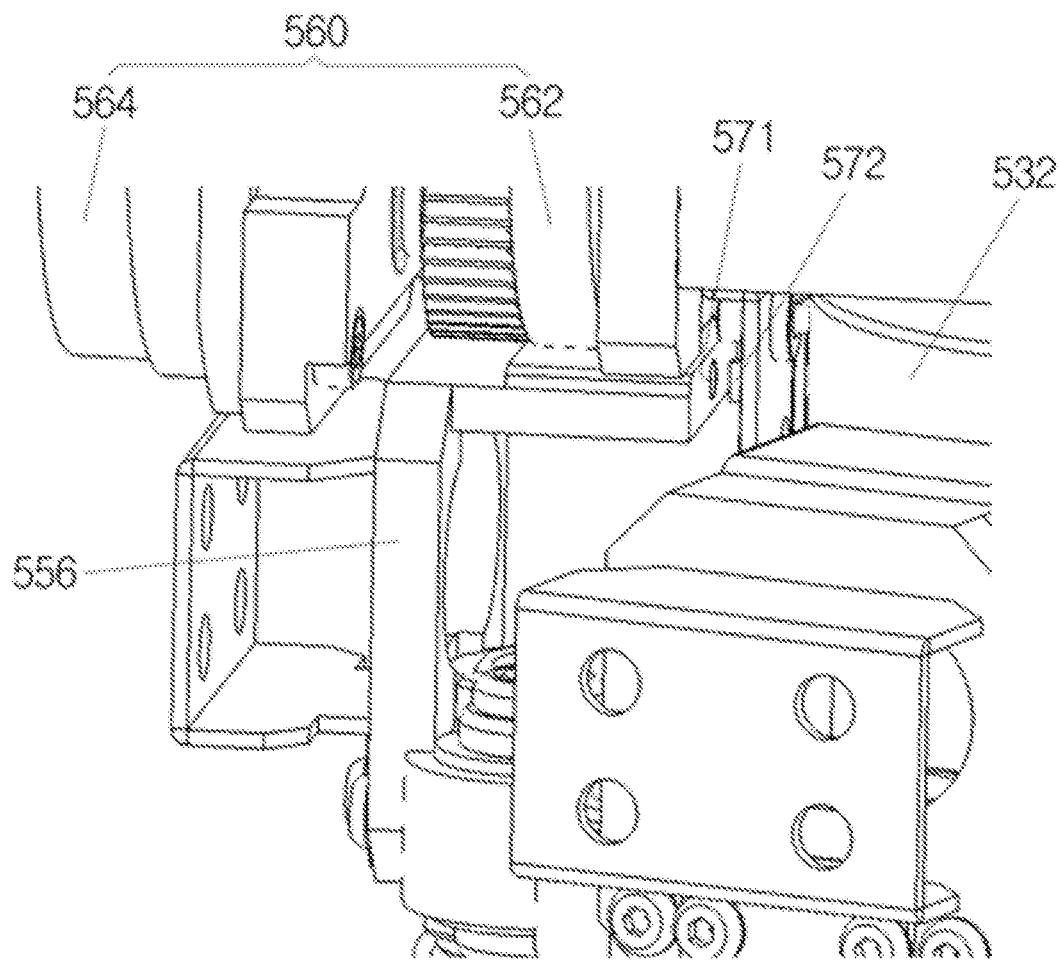

[Fig. 10]
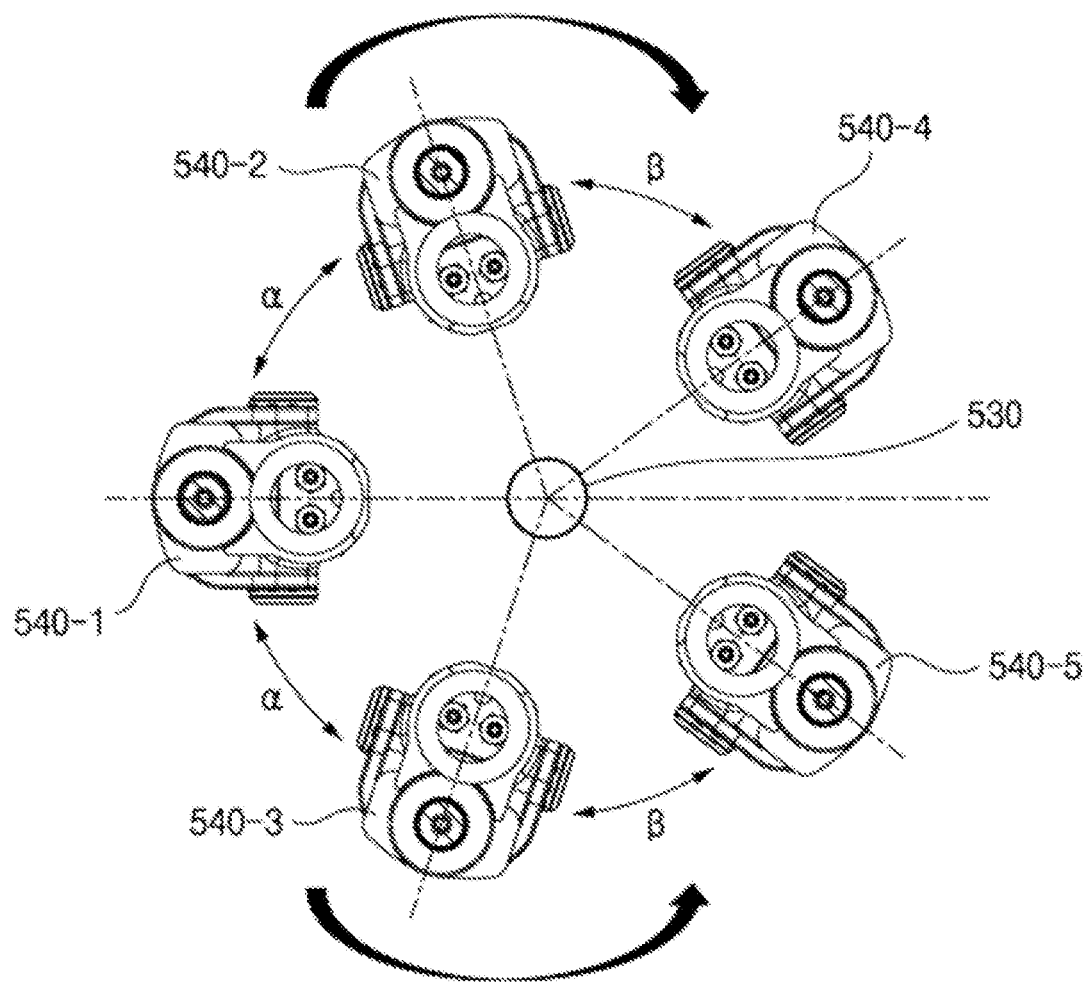

[Fig. 11]
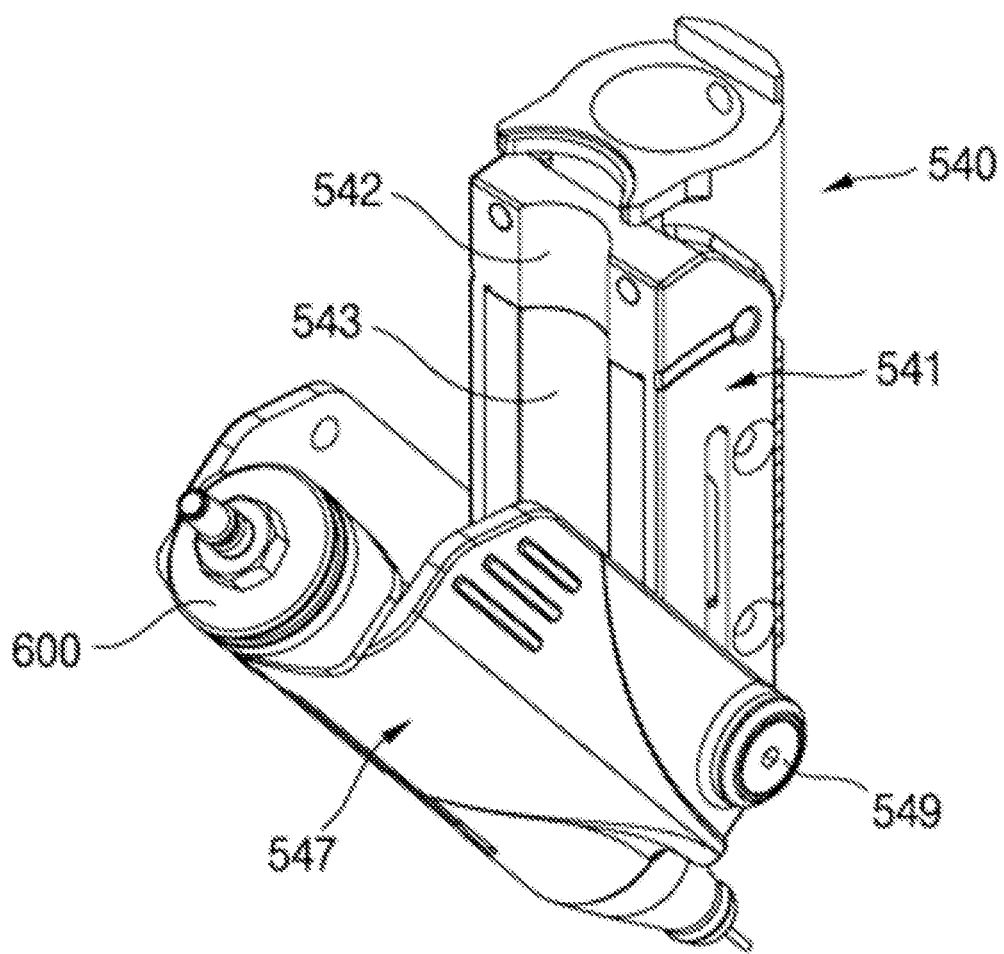

[Fig. 12]
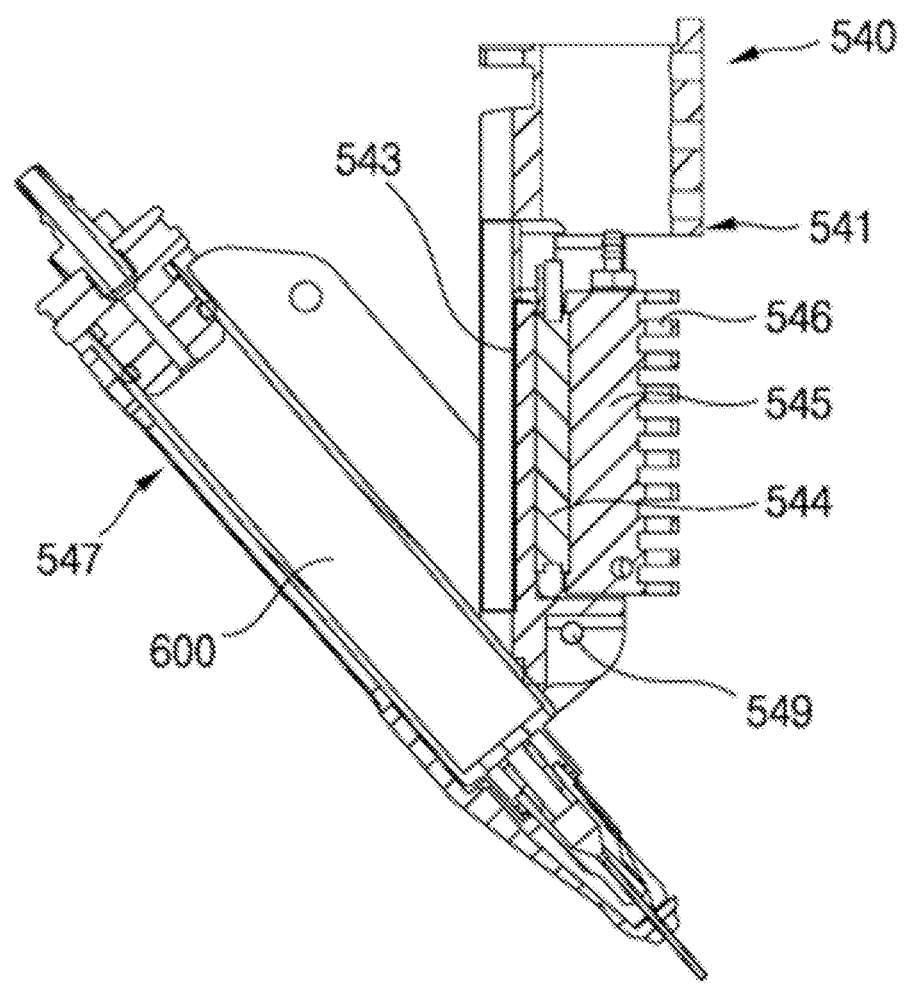

[Fig. 13]
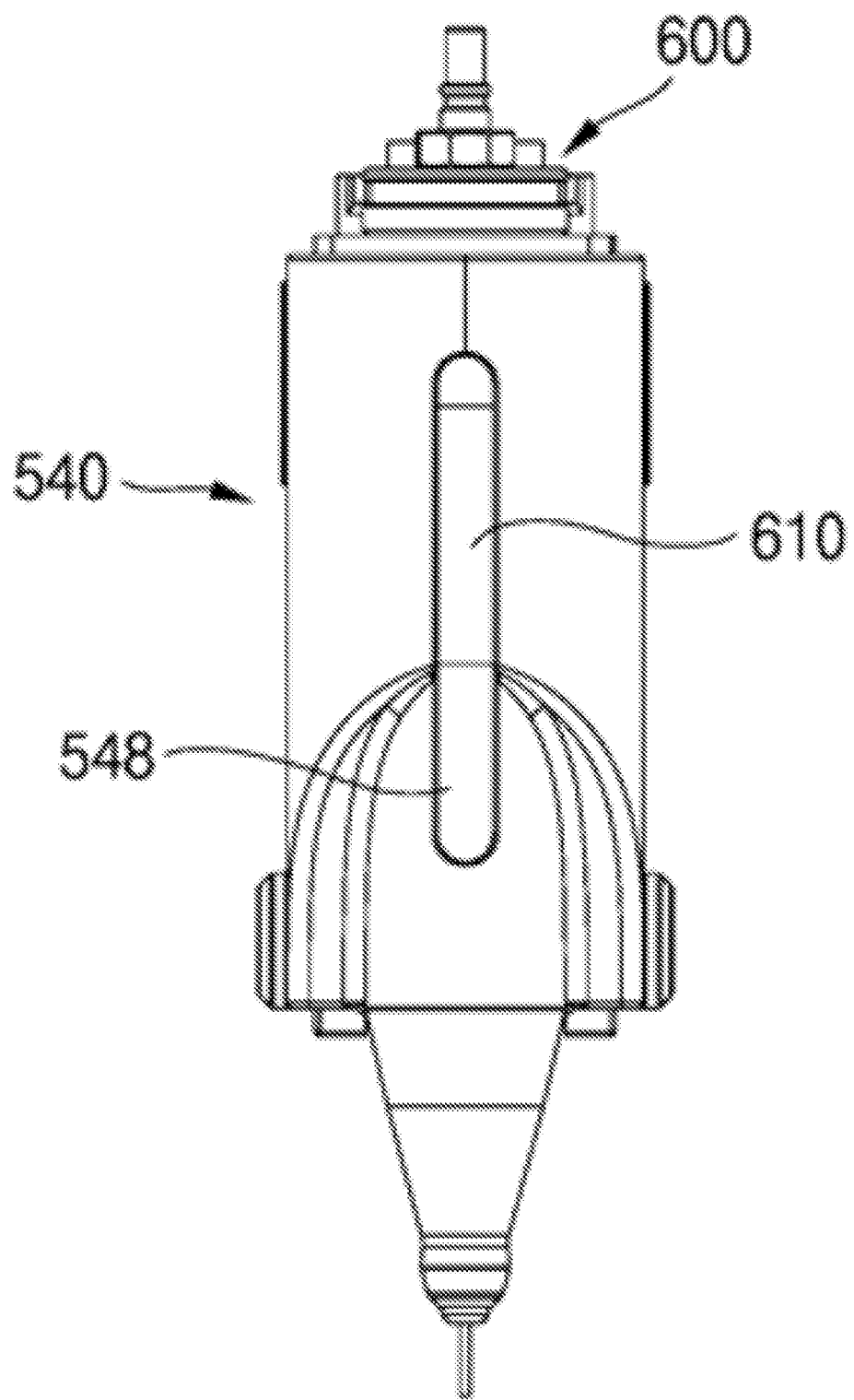

[Fig. 14]
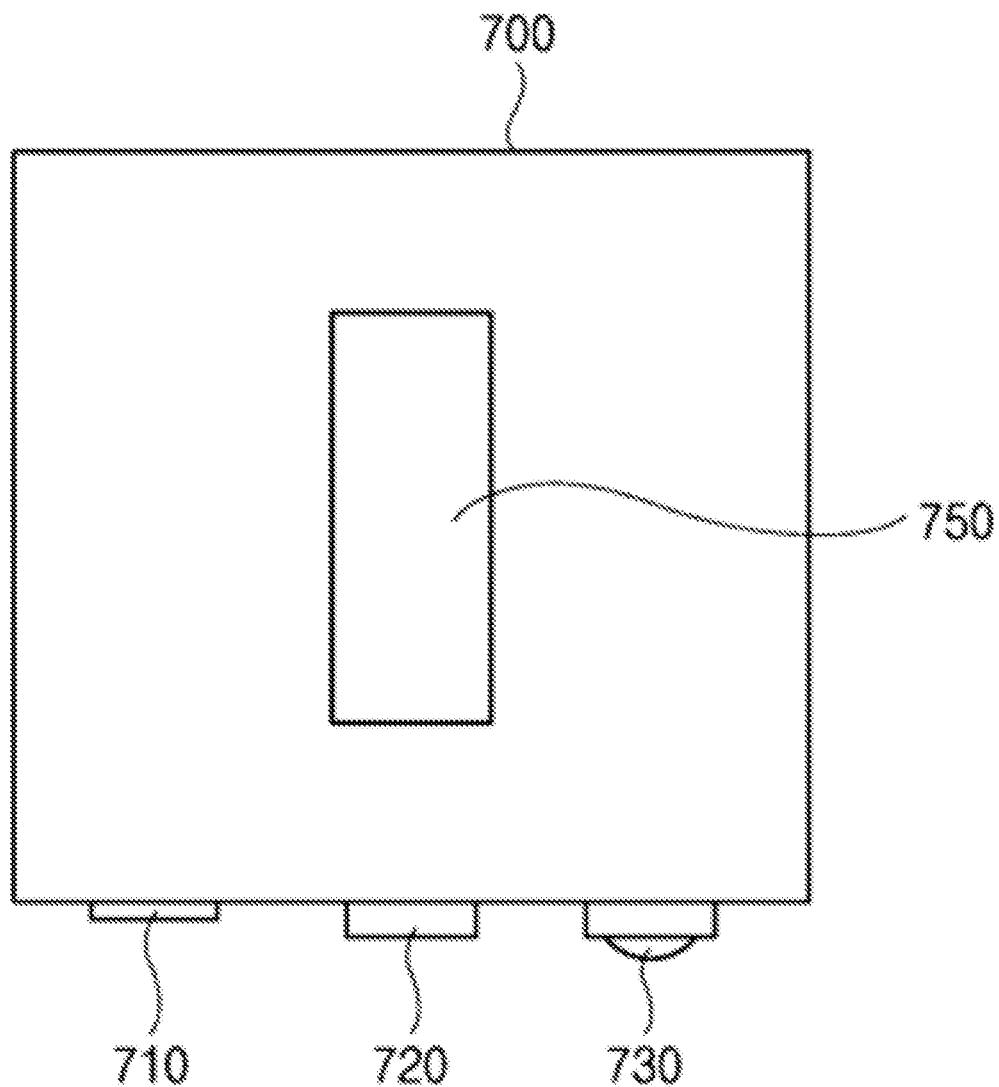

[Fig. 15]
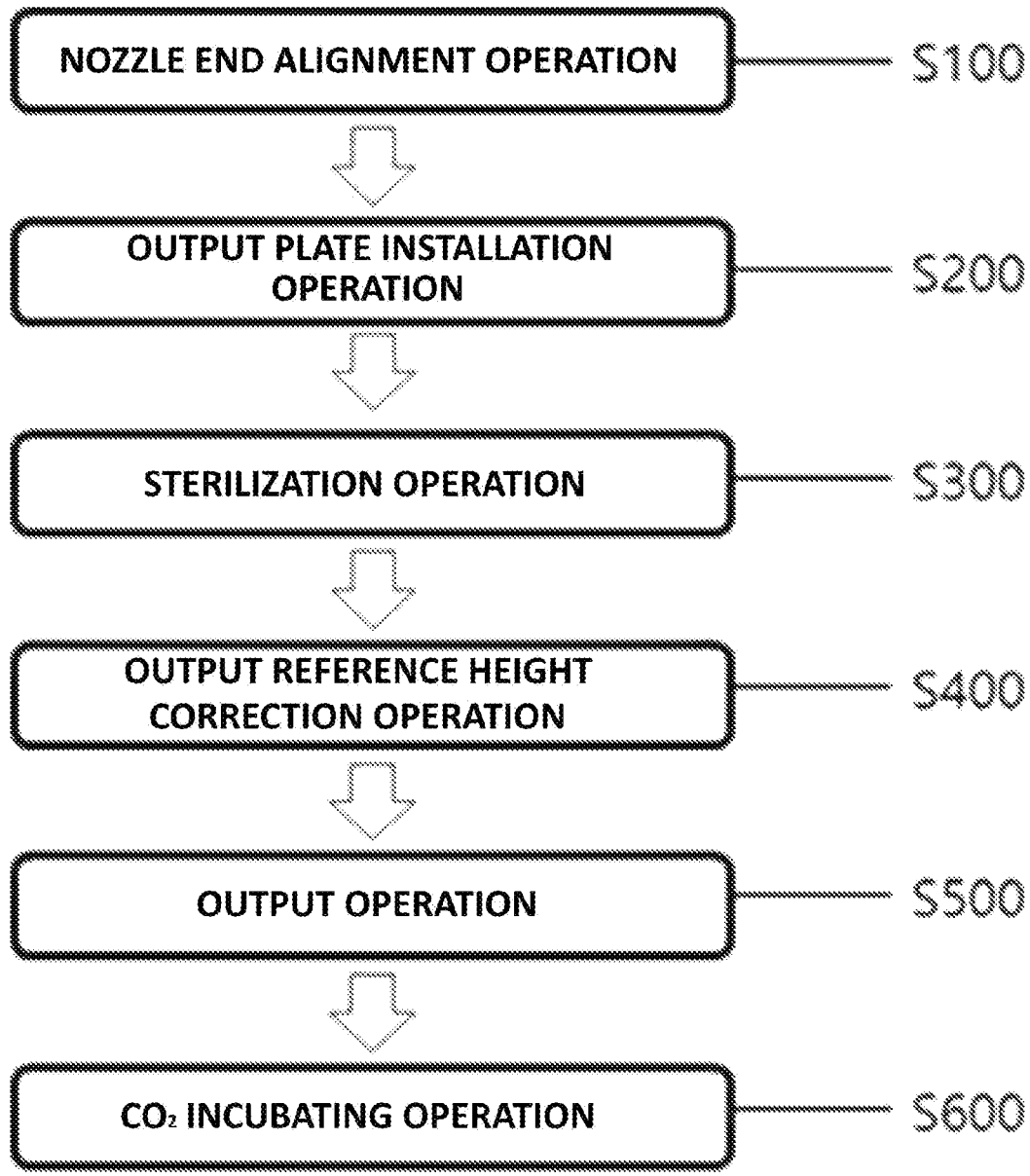

[Fig. 16]
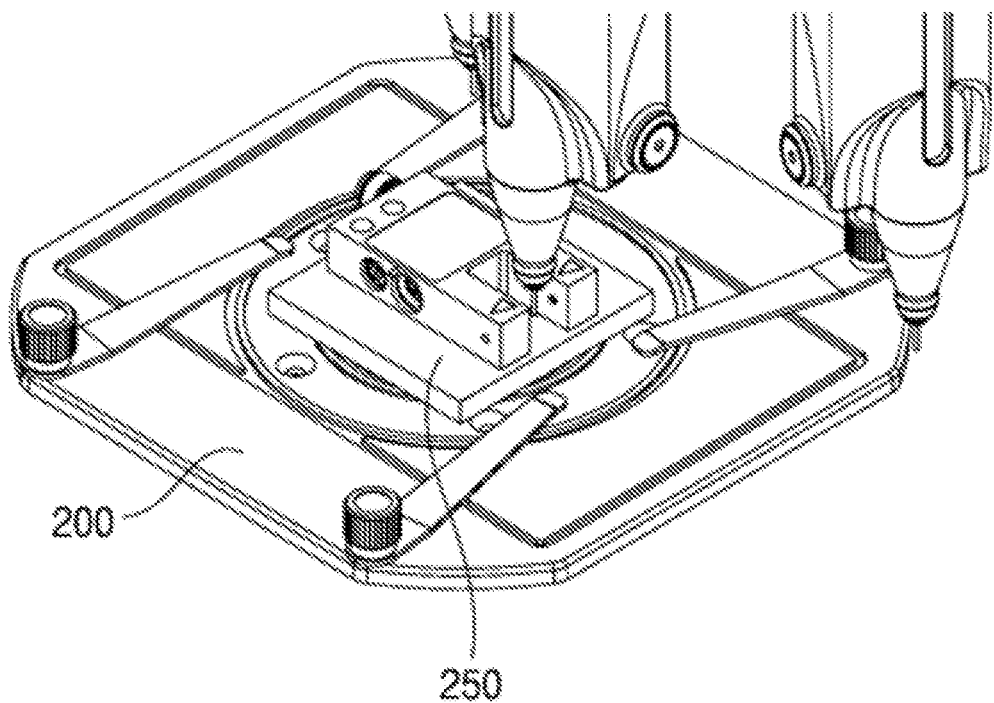

– 1 –

THREE-DIMENSIONAL BIOPRINTER HAVING MULTI-SYRINGE OUTPUT MODULE

TECHNICAL FIELD

The present invention relates to a three-dimensional bioprinter, and more particularly, to a three-dimensional bioprinter having a multi-syringe printing module on which a plurality of syringes are mounted and allow to selectively output a biomaterial.

BACKGROUND ART

Recently, as research fields of tissue engineering and regenerative medicine and a demand for customized medical services increase, research on three-dimensional printers using biomaterials is being actively conducted.

A well-known three-dimensional printer includes a frame constituting XYZ axes and a nozzle in the form of a dispenser for discharging biomaterials. In such a conventional printer, a nozzle is filled with a biomaterial in the form of a viscous fluid such as collagen or gelatin. A pneumatic system is connected to the nozzle filled with the biomaterial in the form of a fluid and ejects the biomaterial while pushing the biomaterial.

However, in this discharging method, when the biomaterial is not in a fluid form, the nozzle should be heated at a high temperature to convert the biomaterial into a fluid form before discharging. Therefore, in order to use a fluid biomaterial and a solid biomaterial together, a process of cooling the nozzle after heating the nozzle is repeated, and thus, a problem may occur due to overload of the nozzle.

In order to solve this problem, a three-dimensional bioprinter is disclosed in Korean Patent Registration No. 10-1828345, in which a first nozzle which outputs a solid material forming a scaffold and other structures and a second nozzle which outputs a biomaterial (bio-ink) in a fluid form are separately provided. However, since only a single syringe can be mounted in the conventional second nozzle, there is a disadvantage that an output using a plurality of bio-inks cannot be achieved.

DISCLOSURE

Technical Problem

The present invention is directed to providing a three-dimensional bioprinter having a multi-syringe printing module on which a plurality of syringes are mounted and allow to selectively output a biomaterial.

The present invention is directed to providing a three-dimensional bioprinter having a multi-syringe printing module to be provided in a printing chamber that provides a sealed output environment.

The present invention is directed to providing a three-dimensional bioprinter having a multi-syringe printing module in which a plurality of syringes containing a fluid biomaterial are mounted in an output preparation stage and each allow to output the biomaterial under each set output condition.

Technical Solution

According to an aspect of the present invention, there is provided a three-dimensional bioprinter including a case, a printing chamber, a multi-syringe printing module, and a lift up/lift down unit. The printing chamber is provided inside the case and formed to be surrounded by wall surface so that an inside of the printing chamber is isolable from an outside thereof and has a chamber door. The multi-syringe printing module includes a hollow cylinder portion fixed into an opening of an upper surface of the printing chamber and having open upper and lower ends, a packing plate installed inside the cylinder portion to separate the cylinder portion into an upper zone and a lower zone isolated from each other, a rotary shaft having one end fixed to the packing plate and extending upward, a plurality of syringe holders disposed below the packing plate in a circumferential direction so that syringes are mounted thereon, a syringe holder support portion configured to support the syringe holder below the packing plate, and a rotary shaft driving unit configured to rotate the rotary shaft so that the syringe holder selected from the plurality of syringe holders is rotated to an output position. The lift up/lift down unit has a vertical movement unit disposed outside the printing chamber and connected to the syringe printing module to control lift up/lift down of the syringe printing module.

The three-dimensional bioprinter may include a rotary shaft support portion configured to rotatably support the rotary shaft, in which the rotary shaft driving unit may include a support of which one end is fixed to the rotary shaft support portion and the other end is fixed to the vertical movement unit, an encoder motor configured to rotate the rotary shaft, and a potentiometer mounted on the support, a pulley may be formed at each of an end portion of the rotary shaft, an end portion of the potentiometer, and an end portion of the encoder motor, and timing belts may be formed between the pulley of the end portion of the rotary shaft and the pulley of the end portion of the potentiometer and between the pulley of the end portion of the potentiometer and the pulley of the end portion of the encoder motor.

The cylinder portion may be formed of a rigid material, and an outer peripheral surface of the packing plate may be in contact with an inner peripheral surface of the cylindrical portion so that the packing plate is rotatable and raisable/lowerable.

The syringe holder support portion may include a syringe holder moving shaft having a lower end fixed to the syringe holder and extending upward through the packing plate, a fixing guide fixed to an upper surface of the packing plate so that the syringe holder moving shaft passes through the fixing guide, a moving guide fixed to an upper portion of the syringe holder moving shaft to be raised/lowered together with the syringe holder moving shaft, a spring configured to move the moving guide upward when an external force for lowering the moving guide is not applied, and a syringe holder lift up/lift down drive unit configured to push the moving guide and move the syringe holder moving shaft from a standby height to an output start height when the rotary shaft rotates and the syringe holder selected to perform an output operation moves to a set output position.

The syringe holder lift up/lift down drive unit may include a cam drive motor fixed to a bracket fixed to the rotary shaft support portion and a cam driven by the cam drive motor to lower the moving guide of the syringe holder located at the output position, and the syringe holder lift up/lift down drive unit may further include a detection unit configured to detect that the selected syringe holder moves to the output position.

The detection unit may include a magnet attached to the moving guide, and a magneto-resistive (MR) sensor installed in a bracket fixed to the rotary shaft support portion and configured to detect a magnet attached to the moving guide of the syringe holder moving to the output position.

A near field communication (NFC) tag on which an output condition including a temperature condition is recorded may be attached to each syringe mounted on the syringe holders, and an NFC reader that reads the NFC tag in a non-contact manner is provided inside the printing chamber.

The syringe holder may include a syringe holder body including a seating groove in which the syringe is mounted, a heating element disposed in the seating groove, and a cooling block provided on an outer surface thereof, and a syringe holder cover installed to open or close the syringe holder body in a hinge manner. Moreover, a Peltier element for cooling the heating element to face the heating element may be installed in the syringe holder body, the cooling block may be coupled to the Peltier element and include a through hole through which a cooling water pipe provided to pass through the packing plate passes, and a reading window located to correspond to a tag attachment position to read the tag, which is attached to the syringe mounted inside the syringe holder cover, from an outside may be formed in the syringe holder cover.

The syringe holders may be installed as N (N is a natural number greater than or equal to three) syringe holders, a syringe holder located at the output position in a state where the rotary shaft is set may be defined as a first syringe holder, and forward/rearward rotation of the rotary shaft may be controlled at a rotation angle of 180° or less in clockwise and counterclockwise directions while a position of the first syringe holder is set to 0°.

Advantageous Effects

According to the present invention, a biomaterial can be selectively output using a plurality of syringes inside a printing chamber. Accordingly, since the printing chamber is sealed and the biomaterial can be output while changing the biomaterial without opening the printing chamber, contamination that can occur between outputting operations can be prevented.

According to the present invention, a plurality of syringes can be mounted on a multi-syringe printing module, and rotation and/or lift up/lift down of the syringe is possible while preventing contaminants from flowing into the printing chamber. Therefore, the multi-syringe printing module can be applied to the printing chamber having a closed output environment.

DESCRIPTION OF DRAWINGS

FIG. 1 is a perspective view of an exterior of a three-dimensional bioprinter according to one embodiment of the present invention.

FIG. 2 is a perspective view of an exterior of a printing chamber provided inside the three-dimensional bioprinter according to one embodiment of the present invention.

FIG. 3 is a front view of an interior of the printing chamber according to one embodiment of the present invention.

FIG. 4 is a longitudinal cross-sectional view illustrating a state in which some parts are removed from the printing chamber according to one embodiment of the present invention.

FIG. 5 is a lateral cross-sectional view illustrating a state in which some parts are removed from the printing chamber according to one embodiment of the present invention.

FIG. 6 is a cross-sectional view for describing an installation structure of a bed in the printing chamber according to one embodiment of the present invention.

FIG. 7 is a view illustrating a moving unit of the three-dimensional bioprinter according to one embodiment of the present invention, and the moving unit is installed inside a case.

FIG. 8 is a view for describing an installation structure of a multi-syringe printing module according to one embodiment of the present invention.

FIG. 9 is a view for describing an arrangement of a magnet and a magneto-resistive (MR) sensor for detecting that a syringe holder selected from the multi-syringe printing module according to one embodiment of the present invention moves to an output position.

FIG. 10 is a view illustrating an arrangement of each syringe holder in the multi-syringe printing module according to one embodiment of the present invention.

FIG. 11 is a perspective view of the syringe holder in an open state according to one embodiment of the present invention.

FIG. 12 is a cross-sectional view of the syringe holder in an open state according to one embodiment of the present invention.

FIG. 13 is a front view of the syringe holder in a closed state according to one embodiment of the present invention.

FIG. 14 is a view for describing a center unit according to one embodiment of the present invention.

FIG. 15 is a flowchart for describing a control method of the three-dimensional bioprinter according to one embodiment of the present invention.

FIG. 16 is a view for describing a nozzle end alignment operation according to one embodiment of the present invention.

MODES OF THE INVENTION

Hereinafter, embodiments of the present invention will be described with reference to the accompanying drawings. The present invention may be embodied in several different forms and thus is not limited to the embodiments described herein. In addition, the accompanying drawings are only for easy understanding of the embodiments disclosed herein, a technical idea disclosed herein is not limited by the accompanying drawings, and it is to be understood to cover all modifications, equivalents or substitutes falling within spirit and scope of the present invention. Moreover, in order to clearly describe the present invention in the drawings, portions irrelevant to the description are omitted, and the size, shape, and form of each component illustrated in the drawings may be variously modified.

The suffixes "module" and "portion" for components used in the following description are given or mixed in consideration of only the ease of writing the specification and do not have distinct meanings or roles by themselves. In addition, in describing the embodiments disclosed in the present specification, when it is determined that detailed descriptions of related known technologies may obscure the gist of the embodiments disclosed in the present specification, detailed descriptions thereof are omitted.

Throughout the specification, when it is said that a portion is connected (coupled, fixed) to another portion, this includes not only the case where they are directly connected (coupled, fixed), but also the case where they are indirectly connected (coupled, fixed) with another member interposed therebetween.

Terminology used herein is only used to describe specific embodiments and is not intended to limit the present invention. A singular expression includes a plural expression unless the context clearly indicates otherwise, and components implemented in a dispersed form may be implemented in a combined form unless there is a special limitation. In the present specification, terms such as "comprise" or "have" are intended to designate that a feature, number, step, operation, component, part, or combination thereof described in the specification exists, and it should be understood that use of these terms does not preclude the possibility of addition or existence of one or more other features or numbers, steps, operations, components, parts, or combinations thereof.

Also, terms including ordinal numbers such as first, second, or the like used herein may be used to describe various elements, but the elements should not be limited by the terms. The above terms are used only for the purpose of distinguishing one component from another component. For example, without departing from the scope of the present invention, a first component may be referred to as a second component, and similarly, a second component may also be referred to as a first component.

A three-dimensional bioprinter 1 according to one embodiment of the present invention may include a case 10, a printing chamber 100, a bed 200, a moving unit 300, a single printing module 400, a multi-syringe printing module 500, a center module 700, and a control unit 900.

The control unit 900 controls an operation of the three-dimensional bioprinter and includes a calculation unit, a storage unit, and a wired/wireless interface for communication with various sensors and peripheral devices. In FIG. 1, the control unit 900 is illustrated as being disposed outside the case 10, but the control unit 900 may be embedded inside the case of the three-dimensional bioprinter 1.

FIG. 1 is a perspective view of an exterior of a three-dimensional bioprinter according to one embodiment of the present invention.

As illustrated in FIG. 1, the case 10 includes an upper surface, a lower surface, and a side surface to surround an interior of the three-dimensional bioprinter, and a case door 12 is installed in a front surface. The case door 12 includes a transparent window 14 through which a printing chamber 100 inside the case can be externally observed.

According to the embodiment of the present invention, the three-dimensional bioprinter adopts a double door method having the case door 12 and a chamber door 110, and thus, it is possible to advantageously isolate an inside of the printing chamber 100 from an outside thereof.

FIG. 2 is a perspective view of an exterior of the printing chamber provided inside the three-dimensional bioprinter according to one embodiment of the present invention. FIG. 3 is a front view of an interior of the printing chamber according to one embodiment of the present invention. FIG. 4 is a longitudinal cross-sectional view illustrating a state in which some parts are removed from the printing chamber according to one embodiment of the present invention, FIG. 5 is a lateral cross-sectional view illustrating a state in which some parts are removed from the printing chamber according to one embodiment of the present invention, and FIG. 6 is a cross-sectional view for describing an installation structure of a bed in the printing chamber according to one embodiment of the present invention.

The printing chamber 100 is provided inside the case 10. The printing chamber 100 is surrounded by wall surfaces, that is, a bottom surface 101, a top surface 104, and side surfaces 106 so that an inside thereof can be isolated from an outside. The chamber door 110 having a transparent window 112 is installed on the front surface of the printing chamber 100.

According to the embodiment of the present invention, the printing chamber 100 includes a temperature control unit 120, a humidity control unit 130, and an air circulation unit 140 so that air purification, temperature control, and humidity control are possible in a state in which a printing space inside the printing chamber 100 is sealed.

The temperature control unit 120 includes a water jacket 122 formed on the outside of the side surface 106 of the printing chamber 100 and a heater 124 installed on an outer wall of the water jacket 122.

The water jacket 122 is a chamber formed to surround an outer wall of at least a portion of the side surface 106 of the printing chamber 100, and water is accommodated inside the water jacket 122. The heater 124 is installed on the outer wall of the water jacket 122. The heater 124 heats the water inside the water jacket 122 to control the temperature in the printing chamber 100. The control unit 900 receives a sensing value from a temperature sensor (not illustrated) that detects the temperature inside the printing chamber 100 and controls turning ON/OFF of the heater 124.

The humidity control unit 130 controls humidity by providing moisture inside the printing chamber 100. According to the embodiment of the present invention, the humidity control unit 130 is provided on an air circulation path formed by the air circulation unit 140. The air circulation unit 140 is for filtering and purifying air while circulating air inside the printing chamber 100.

According to the embodiment of the present invention, the air circulation unit 140 includes an inlet 141, an air duct 142, an outlet 144, a filter 146 for filtering and purifying the circulation air, and a blade (not illustrated) which generates an air circulation flow.

The inlet 141 is formed in one side of the top surface 104 of the printing chamber 100. The filter 146, such as a high-efficiency particulate air (HEPA) filter, is installed in the inlet 141 to remove contaminants contained in air being introduced into the inside of the printing chamber 100.

A blade for generating the air circulation flow is installed in the blade installation portion 148 inside the air duct 142 formed adjacent to the inlet 141. The blade is rotated by a motor 149 disposed outside the air duct 142. It is possible to block the inflow of contaminants such as particles generated when the motor 149 is driven.

According to the embodiment of the present invention, the humidity control unit 130 uses the air circulation of the air circulation unit 140.

According to the embodiment of the present invention, the humidity control unit 130 includes a tray 132 for accommodating water therein, and the tray 132 is provided at a side of the outlet 144.

The tray 132 is provided in the outlet 144 in the form of an opening. By providing the tray 132 for accommodating water at the side of the outlet 144, evaporation and diffusion of moisture contained in the tray 132 is induced by the circulating air introduced into the printing chamber 100 through the outlet 144. In addition, the humidity control unit 130 includes a heating element 134 installed below the tray 132, and by heating the water stored in the tray 132 with mild heat, humidity control can be performed more quickly.

The heating element 134 is disposed on a lower surface of a bottom surface of the printing chamber 100 to correspond to a bottom surface of the tray 132. Accordingly, cables such as a power line and a control line to the heating element 134 may be connected to the outside of the printing chamber 100. The heating element 134 is controlled by the control unit 900 that receives a sensing signal of a sensor (not illustrated) capable of detecting humidity inside the printing chamber 100.

According to the embodiment of the present invention, the air duct 142 extends into the water jacket 122. Referring to the drawings, the air duct 142 is formed in a path extending from the upper surface of the printing chamber 100 to a lower side of the side surface and extends downward while passing through the inside of the water jacket 122. The arrangement of the air duct 142 is more advantageous for the temperature control of the printing chamber 100.

A light emitting diode (LED) lighting device (not illustrated) and an ultraviolet (UV) lamp (not illustrated) may be installed inside the printing chamber 100. The UV lamp may be used to sterilize harmful microorganisms or the like inside the printing chamber 100.

According to the embodiment of the present invention, the printing chamber 100 is formed to output a biomaterial from therein in a state where the inside thereof is sterilized. To this end, the printing chamber 100 is connected to a gas generator for sterilization so that the sterilization can be performed therein. The gas generator for sterilization includes an $H_2O_2$ plasma sterilizer 165 and is provided outside the printing chamber 100.

A sterilizing gas inlet 162 and a sterilizing gas outlet 164 are formed in the printing chamber 100. The sterilizing gas inlet 162 is a passage through which an $H_2O_2$ sterilizing gas is introduced from the $H_2O_2$ plasma sterilizer 165 and the sterilizing gas outlet 164 is used to exhaust the $H_2O_2$ sterilizing gas inside the printing chamber 100 after the sterilization operation.

The sterilization may be performed before the output proceeds in a state in which an output plate 201 for supporting an output is installed in the bed 200 of the printing chamber 100. When a sterilization command is input, the $H_2O_2$ sterilizing gas generated in the $H_2O_2$ plasma sterilizer 165 is introduced into the printing chamber 100 through the sterilizing gas inlet 162, and the sterilization operation is performed for a predetermined time. Thereafter, a ventilation operation in which the $H_2O_2$ sterilizing gas is ventilated through the sterilizing gas outlet 164 is performed.

According to the embodiment of the present invention, the printing chamber 100 is configured to allow $CO_2$ incubation without stopping after the output is printed. To this end, the printing chamber 100 has an incubating gas inlet 172 and an incubating gas outlet 174 for forming the inside of the printing chamber 100 as a $CO_2$ incubating atmosphere. The incubating gas inlet 172 is connected to a regulator (not illustrated) and a $CO_2$ tank 175 to allow $CO_2$ gas to be introduced into the printing chamber 100, thereby controlling a concentration of carbon dioxide in the printing chamber 100. The incubating gas outlet 174 is a path through which the internal air is discharged to control the concentration of $CO_2$ inside the printing chamber 100.

For incubation after outputting a living tissue, an environment with a concentration of 3 to 5% carbon dioxide, a temperature of about 37° C., and a humidity of about 80% should be set. Incubating while the concentration of the carbon dioxide is controlled is referred to as the $CO_2$ incubation.

According to the present invention, the printing chamber 100 is formed in a structure to be sealed from the outside, and the concentration of the carbon dioxide inside the printing chamber 100 may be adjusted for the $CO_2$ incubation. Therefore, the $CO_2$ incubation can be performed on the spot after the output of the living tissue.

The bed 200 installed movably in an X-axis direction and a Y-axis direction is provided on the bottom surface of the printing chamber 100 according to the embodiment of the present invention.

According to the embodiment of the present invention, the bottom surface 101 of the printing chamber 100 is formed with a bottom surface opening 102, and the bed 200 is disposed on the bottom surface opening 102. The bed 200 moves within a movement area permitted by the bottom surface opening 102. An upper surface of the bed 200 is formed so that the output plate 201 on which the output is output may be fixed at a predetermined position.

The bed 200 is connected to a horizontal movement unit 310 installed at a lower portion of the printing chamber 100. The horizontal movement unit 310 is connected to the bed 200 to move the bed 200 in the X-axis direction and the Y-axis direction. A lower portion of the bed 200 is fixed to the horizontal movement unit 310. In the present specification, the bed 200 is disposed inside the printing chamber and includes both the portion, to which the output plate 201 is coupled, and the lower portion connected to the horizontal movement unit 310.

According to the embodiment of the present invention, a first bellows 210 is installed between the lower portion of the bed 200 and an inner peripheral surface of the bottom surface opening 102. The bed 200 is disposed at a center hole 211 of the first bellows 210, and the lower portion of the bed 200 extends to the lower portion of the first bellows 210 through the center hole 211 and is connected to the horizontal movement unit 310. A main surface of the center hole 211 is fixed to the lower portion of the bed 200 in a sealable manner. Accordingly, the first bellows 210 covers a space between the bed 200 and the inner peripheral surface of the bottom surface opening 102 and isolates the inside of the printing chamber from a space below the bottom surface of the printing chamber. Therefore, it is possible to prevent particles or external contamination generated during operation of the horizontal movement unit 310 from being introduced through the bottom surface opening 102. That is, the movement of foreign substances between the upper and lower portions of the first bellows 210 is prevented. In addition, since the first bellows 210 is deformed due to elasticity, the bed 200 is allowed to move in the X-axis direction and the Y-axis direction.

FIG. 7 is a view illustrating a moving unit of the three-dimensional bioprinter according to one embodiment of the present invention, and the moving unit is installed inside the case.

As illustrated in FIG. 7, the moving unit 300 according to the embodiment of the present invention includes the horizontal movement unit 310 which is horizontally disposed to generate the movements in the X-axis direction and the Y-axis direction, and vertical movement units 350 and 360 which generate a Z-axis movement.

The horizontal movement unit 310 is disposed in the space below the bottom surface of the printing chamber 100 inside the case 10.

The horizontal movement unit 310 includes a first horizontal movement unit 320 which generates driving in the X-axis direction and a second horizontal movement unit 330 disposed above the first horizontal movement unit to generate driving in the Y-axis direction. When the first horizontal movement unit 320 generates the driving in the Y-axis direction, the second horizontal movement unit 330 generates the driving in the X-axis direction.

Each of the first horizontal movement unit 320 and the second horizontal movement unit 330 includes a guide rail and a step motor. When the step motor of the first horizontal movement unit 320 is driven and controlled by the control unit 900, the second horizontal movement unit 330 supported by an upper portion of the guide rail moves in the X-axis direction. The second horizontal movement unit 330 moves in the Y-axis direction from above the first horizontal movement unit 320.

The bed 200 is fixed to a moving plate supported by the guide rail of the second horizontal movement unit 330. By the movement of the first horizontal movement unit 320 and the second horizontal movement unit 330, the bed 200 is controlled to move in the X-axis and Y-axis directions.

According to the embodiment of the present invention, the vertical movement units 350 and 360 include a first vertical movement unit 350 and a second vertical movement unit 360 and are installed outside the side surface of the printing chamber.

The first vertical movement unit 350 controls movement in the Z-axis direction of the single printing module 400, that is, raising and lowering thereof, and the second vertical movement unit 360 controls movement in the Z-axis direction of the multi-syringe printing module 500, that is, raising and lowering thereof. Each of the first and second vertical movement units 350 and 360 include a guide rail and a step motor. Each of the single printing module 400 and the multi-syringe printing module 500 is connected to a moving plate supported by each guide rail.

A hollow pipe 410 is fixed to the moving plate of the first vertical movement unit 350, the single printing module 400 is connected to the hollow pipe 410, and thus, the raising and lowering of the single printing module 400 are controlled.

By fixing a support 480 for supporting the multi-syringe printing module 500 to a moving plate 362 of the second vertical movement unit 360, the raising and lowering of the multi-syringe printing module 500 are controlled.

The single printing module 400 and the multi-syringe printing module 500 are provided inside the printing chamber 100 according to the embodiment of the present invention.

A structure for fixing the single printing module 400 will be described with reference to FIGS. 2 to 7.

The single printing module 400 may be provided to output a solid biomaterial for forming a structure such as a scaffold, a drug structure, or a frame structure. For example, the single printing module 400 may adopt an extruder module which outputs filaments, a hot-melting module which is a melting high-pressure injection machine that melts a polymer material in the form of medicine or granules contained therein at high heat and outputs the polymer material pneumatically, or the like. However, the single printing module is not limited to outputting the solid biomaterial. Meanwhile, the solid biomaterial refers to a material that maintains a solid state in a cured state, and the biomaterial includes various materials that can be used for bio-related output and is not limited to a specific material.

Looking at the fixed structure of the single printing module 400, a side opening 107 is formed on the side surface 106 facing the door 110 of the printing chamber 100. The hollow pipe 410 extends inward through the side opening 107. The hollow pipe 410 is supported by the moving plate of the first vertical movement unit 350 and is moved in the Z direction, that is, in the lift up/lift down direction.

A second bellows 420 is installed between an outer peripheral surface of the hollow pipe 410 and an inner peripheral surface of the side opening 107 to block the inside and the outside of the side opening 107. The hollow pipe 410 extends into the printing chamber 100 in a state in which an outer peripheral surface of the hollow pipe 410 is surrounded by the inner peripheral surface of the second bellows 420. Therefore, the second bellows 420 covers a space between the outer peripheral surface of the hollow pipe 410 and the inner peripheral surface of the side opening 107 to isolate the inside of the printing chamber from the outside of the printing chamber.

The second bellows 420 can prevent external contaminants, such as particles, from flowing through the side opening 107 while allowing the hollow pipe 410 to move up and down in the Z-axis direction due to elasticity thereof.

A blocking plate 415 is provided in front of the hollow pipe 410. The single printing module 400 is installed on the blocking plate 415 in a replaceable manner. The blocking plate 415 facilitates replacement of the single printing module 400 while preventing external contaminants from being introduced through the inside of the hollow pipe 410.

Cables such as a power line and a control line required for driving the single printing module 400, an air pipe for application of pneumatic pressure, a hose pipe such as a cooling water pipe, and the like are introduced into the printing chamber 100 through the inside of the hollow pipe 410 and are connected to a connector 417 on a peripheral surface of the blocking plate 415 and/or the hollow pipe 410. The connector 417 is a path through which the cables, the hose pipe, and the like are connected to the inside while preventing the inflow of foreign substances. The single printing module 400 may receive power, a control signal, air, and cooling water from the outside via the connector 417.

The extruder module, the hot-melting module, or the like used as the single printing module 400 is mounted on the blocking plate 415 to control movement according to the movement of the hollow pipe 410.

As illustrated in FIG. 3, the multi-syringe printing module 500 is disposed on one side of the single printing module 400.

According to the embodiment of the present invention, the multi-syringe printing module 500 includes a syringe holder 540 on which a syringe 600 containing a fluid biomaterial is mounted.

Referring to FIGS. 3, 4, and 7 to 13, the multi-syringe printing module according to the embodiment of the present invention will be described.

According to the embodiment of the present invention, the multi-syringe printing module 500 includes a plurality of syringe holders 540, and the plurality of syringes 600 containing different biomaterials are mounted on the syringe holders 540 and may selectively output the biomaterial under the control of the control unit 900, in a set order.

FIG. 8 is a view for describing an installation structure of the multi-syringe printing module according to one embodiment of the present invention.

According to the embodiment of the present invention, the multi-syringe printing module 500 includes five syringe holder 540 and is installed to be rotatable and raisable/lowerable.

Each syringe holder 540 forming the multi-syringe printing module is arranged in the circumferential direction about a center line extending along a center of a rotary shaft 530 and is rotatably installed by the rotary shaft 530. In addition, the multi-syringe printing module 500 is connected to the second vertical movement unit 360 so that the lift up/lift down thereof is entirely controlled in the Z-axis direction, and the syringe holder 540 located at an output position is installed to be raisable/lowerable between a standby height and an output start height.

When describing the multi-syringe printing module in the present specification, the term "output position" means a position on an X-Y coordinate system where the output from the syringe is made. The output position is specified with specific coordinates when setting up the device. Each syringe holder moves to the output position while rotating about the rotary shaft, and the syringe is controlled to output a biomaterial at the output position.

In the output position, the syringe holder may be controlled to be raisable or lowerable in the Z-axis direction. The syringe holder may have the standby height and the output start height at the output position. When the output is made from the syringe mounted on the syringe holder located at the output position, first, the syringe holder is lowered from the standby height to the output start height, and then, the output is made. The standby height may be the same height as the selected syringe holder and surrounding syringe holder. The output start height is a height at which the syringe holder is lowered from the standby height and the selected syringe holder is lower than the surrounding unselected syringe holder and means the height at which the surrounding syringe holder and syringe do not interfere during the output.

According to the embodiment of the present invention, the multi-syringe printing module includes a hollow cylindrical portion 510 (see FIG. 3), a packing plate 520, the rotary shaft 530, a syringe holder support portion 550, a syringe holder lift up/lift down drive unit 560.

The hollow cylindrical portion 510 is formed to have open upper and lower ends and is fixed to the opening of the upper surface 105 of the printing chamber 100. A space between an inner peripheral surface of the opening of the upper surface 105 and an outer peripheral surface of the hollow cylindrical portion 510 is blocked to prevent the inflow of contaminants.

A packing plate 520 is installed inside the hollow cylindrical portion 510. The packing plate 520 divides the inside of the cylindrical portion 510 into an upper zone and a lower zone that are isolated from each other. The packing plate 520 isolates the lower zone, that is, an area located inside the printing chamber from the upper zone connected to the outside, and prevents the inflow of contaminants from the upper zone to the lower zone. The cylindrical portion 510 may be formed of a rigid material such as a plastic material or a metal material, and an outer peripheral surface of the packing plate 520 is in contact with the inner peripheral surface of the cylindrical portion 510 so that the packing plate 520 is rotated and raisable or lowerable. The rotary shaft 530 is fixed to one end of the packing plate 520 and extends upward. The packing plate 520 rotates according to the rotation of the rotary shaft 530, and the packing plate 520 is raised or lowered by the lift up/lift down of the rotary shaft 530.

The rotary shaft 530 is rotatably supported by the rotary shaft support portion 532 rotatably surrounding the rotary shaft 530. The lift up/lift down of the rotary shaft 530 is controlled together with the rotary shaft support portion 532.

The rotation of the rotary shaft 530 is controlled by a rotary shaft driving unit 590. According to the embodiment of the present invention, the rotary shaft driving unit 590 includes a support 591, a rotary shaft driving motor 592, and a potentiometer 593.

The support 591 extends so that one side thereof is fixed to the rotary shaft support portion 532. The support 591 is fixed to the moving plate of the second vertical movement unit 360. Therefore, the raising or lowering of the multi-syringe printing module 500 in the Z-axis direction may be controlled.

The potentiometer 593 and the rotary shaft driving motor 592 are coupled to the support 591, and an end portion of the rotary shaft 530, an end portion of the potentiometer 593, and an end portion of the rotary shaft driving motor 592 protrude from an upper surface of the support 591.

Pulleys 595, 596, and 597 for a timing belt are formed on the end portion of the rotary shaft 530, the end portion of the potentiometer 593, and the end portion of the rotary shaft driving motor. Moreover, the timing belts are installed between the pulley 595 of the end portion of rotary shaft 530 and the pulley 596 of the end portion of the potentiometer 593, and the pulley 596 of the end portion of the potentiometer 593 and the pulley 597 of the end portion of the rotary shaft driving motor 592. That is, two timing belts are installed on the pulley 596 of the end portion of the potentiometer 593.

As the rotary shaft driving motor 592, an encoder motor is used. According to the embodiment of the present invention, while using an encoder motor as the rotary shaft driving motor, the potentiometer 593 is provided on a path in which a rotational force of the encoder motor is transmitted to the rotary shaft, and the rotation of the encoder motor is accurately detected by the potentiometer. Therefore, it is possible to control a rotation angle of the rotary shaft more precisely.

The plurality of syringe holders 540 are arranged to be spaced apart from each other along the circumference about the center line of the rotary shaft 530 below the packing plate 520.

Each syringe holder 540 is supported by the syringe holder support portion 550. According to the embodiment of the present invention, the syringe holder support portion is provided to control the raising or lowering of the syringe holder 540 between the standby height and the output start height.

According to the embodiment of the present invention, the syringe holder support portion 550 includes a syringe holder moving shaft 552, a fixing guide 551, a guide shaft 554, a moving guide 556, and a spring 558.

The syringe holder moving shaft 552 extends from the upper zone to the lower zone through the packing plate 520 and is installed to be raisable or lowerable in the Z-axis direction. The syringe holder 540 is supported by a lower end of the syringe holder moving shaft 552.

The fixing guide 551 is fixed to the upper surface of the packing plate 520, and the syringe holder moving shaft 552 is guided while passing through the fixing guide 551.

The moving guide 556 is fixed to the upper portion of the syringe holder moving shaft 552. The syringe holder moving shaft 552 is raised and lowered by raising or lowering of the moving guide 556, and the raising or lowering of the syringe holder 540 is controlled between the standby height and the output start height.

Movement of the moving guide 556 is guided by the guide shaft 554. A lower end of the guide shaft 554 is fixed to the fixing guide 551 and extends upward. An upper portion of the guide shaft 554 is inserted to be raisable or lowerable into a through hole formed in the moving guide 556. Since the guide shaft 554 is installed to pass through the moving guide 556, the raising or lowering by the guide shaft 554 is made at an aligned position.

A spring 558 is installed on the guide shaft 554 or the syringe holder moving shaft 552. The spring 558 provides an elastic force to the moving guide 556 so that the moving guide 556 moves upward when an external force for lowering the moving guide 556 is not applied. That is, when the external force does not act, the syringe holder 540 is raised to the standby height by the spring 558 and maintained.

The syringe holder lift up/lift down drive unit 560 includes a cam 562 and a cam drive motor 564.

The cam 562 is installed to press the moving guide 566 down at the output position. The cam drive motor 564 rotates the cam 562 under the control of the control unit 900 to press the moving guide 566. As the cam 562 rotates, the syringe holder 540 located at the output position is lowered from the standby height to the output start height while the moving guide 566 is pressed down. Since the raising or lowering of the multi-syringe printing module 500 is entirely controlled in the Z-axis direction, the Z coordinate of the output start height may be different. However, a distance between the standby height and the output start height as a standard of the packing plate 520 is constant.

The cam 562 and the cam drive motor 564 are supported by the rotary shaft support portion 532 through a bracket or the like and raised or lowered together with the rotary shaft support portion 532.

According to the embodiment of the present invention, the selected syringe holder 540 includes a detection unit for detecting whether or not the syringe holder 540 moves to the output position. The detection unit includes a magnet 571 attached to each moving guide 566 and a magneto-resistive (MR) sensor 572 installed at a bracket connected to the rotary shaft support portion 532.

FIG. 9 is a view for describing an arrangement of the magnet and the MR sensor for detecting that the syringe holder selected from the multi-syringe printing module according to one embodiment of the present invention moves to the output position.

When the selected syringe holder 540 moves to the output position while the rotary shaft 530 rotates, the MR sensor 572 detects a magnet attached to the moving guide 566 and outputs a detection signal, and the control unit 900 stops the rotation of the rotary shaft 530 so that the selected syringe holder 540 can be maintained at the output position.

According to the embodiment of the present invention, the control unit 900 designates the syringe holder located at the output position before an initial origin, that is, before an output button is pressed and the output operation starts, among the plurality of syringe holder as a first syringe holder. The forward/backward rotation of the rotary shaft is controlled with reference to the first syringe holder.

According to the embodiment of the present invention, air pipes (not illustrated) are extended through the packing plate 520 and are connected to the syringe 600 mounted on the syringe holder 540. In addition, a power line for the syringe holder, a cable such as a control line, a cooling water pipe, or the like extends downward through the packing plate 520.

The syringe holder 540 moved to the output position is lowered from the standby height to the output start height by the cam 562, and the biomaterial is output by air dispensing.

FIG. 10 is a view illustrating an arrangement of each syringe holder in the multi-syringe printing module according to one embodiment of the present invention.

In the present specification, the syringe mounted on each syringe holder is referred to as the same number as the syringe holder. For example, the syringe mounted on the first syringe holder is referred to as a first syringe, and a syringe mounted on a second syringe holder is referred to as a second syringe.

The syringe holder located at the output position of the multi-syringe printing module when the syringe holder is located at the initial origin set in the encoder motor, that is, a home position, is defined as a first syringe holder 540-1.

According to the present invention, the rotary shaft is controlled at a rotation angle of 180° or less in the clockwise and counterclockwise directions with the position of the first syringe holder as 0°. That is, the forward and backward rotations of the rotary shaft are controlled with reference to the position of the first syringe holder 540-1, and the rotary shaft is controlled at the rotation angle of 180° or less.

The number of the subsequent syringe holder is assigned to cross the opposite side with respect to a reference line connecting the center of the rotary shaft and a center of the first syringe holder. That is, when the position of the first syringe holder 540-1 is defined as 0°, a second syringe holder 540-2 is positioned at a rotation position of $\alpha°$ in the clockwise direction with respect to the first syringe holder 540-1, and a third syringe holder 540-3 is located in a rotation position of $\alpha°$ in the counterclockwise direction with respect to the first syringe holder 540-1. In addition, a fourth syringe holder 540-4 is located in a rotational position of $(\alpha+\beta)°$ in the clockwise direction with respect to the first syringe holder 540-1, and a fifth syringe holder 540-5 is located at a rotation position of $(\alpha+\beta)°$ in the counterclockwise direction with respect to the first syringe holder 540-1.

Therefore, for example, assuming that biomaterials are sequentially output from the first syringe 540-1 to the fifth syringe 540-5, after the biomaterial is output from the first syringe 540-1, the rotary shaft rotates alternately clockwise and counterclockwise to output the bio-ink from the syringe. By such an arrangement of the syringe holders 540, when the multi-syringe printing module is driven, it is possible to prevent twisting of wires, control lines, air pipes, and cooling water pipes connected to the multi-syringe printing module.

FIGS. 10 and 11 are views for describing the syringe holder in the multi-syringe printing module according to the present invention, FIG. 11 is a perspective view of the syringe holder in an open state, and FIG. 12 is a cross-sectional view of the syringe holder in an open state. FIG. 13 is a front view of the syringe holder in a closed state.

As illustrated in FIGS. 11 and 12, the syringe holder 540 according to the embodiment of the present invention includes a syringe holder body 541 and a syringe holder cover 547.

In the syringe holder body 541, a semicircular seating groove 542 corresponding to a shape of the syringe 600 is formed on one side. A heating element 543 is disposed in the seating groove 542 of the syringe holder. A Peltier element is installed as a cooling element 544 corresponding to the heating element 543 on the outer surface of the syringe holder body 541, and a cooling block 545 for heat dissipation is attached to the Peltier element. A cooling fin is formed in the cooling block 545, through holes 546 through which the cooling water pipe passes are formed, and thus, the cooling block 545 is cooled by the cooling water pipe.

The syringe holder cover 547 is installed on the syringe holder body 541 to be openable or closable in a hinge manner. The syringe holder cover 547 is coupled to the syringe holder body 541 by a hinge shaft 549 provided on the lower side. In an open state in which the syringe holder cover 547 is spaced apart from the syringe holder body 541, the syringe 600 is accommodated in the syringe holder cover 547 and the syringe holder cover 547 is closed by being rotated about the hinge.

A reading window 548 in the form of a hole or a transparent window is formed in the syringe holder cover 547 so that a near field communication (NFC) tag 610 attached to the syringe mounted therein can be externally observed.

The syringe holder 540 may control a temperature of the syringe according to an output condition of the syringe stored in the syringe holder in the heating element 543, the cooling element 544, and the cooling block 545. The cooling element and/or cooling block 545 forms a cooling unit.

Referring to FIG. 13, according to the embodiment of the present invention, the NFC tag 610 indicating the output condition of the biomaterial contained in the syringe is attached to each syringe 600, and an NFC reader 750 for reading the NFC tag 610 of the syringe located at the output position is provided in the printing chamber. The NFC reader 750 is provided on a side surface of the center module 700 disposed between the single printing module 400 and the multi-syringe printing module 500 in the printing chamber 100.

When the syringe 600 selected to output a biomaterial from the multi-syringe printing module 500 moves to the output position, the NFC reader 750 reads the NFC tag 610 attached to the syringe 600, the heating element 543 and the cooling unit provided in the syringe holder 540 are controlled, and the syringe temperature is controlled by the read output condition. Thereafter, air is supplied to the syringe 600 and the biomaterial is output under the adjusted output condition.

According to the embodiment of the present invention, the center module 700 is provided between the single printing module 400 and the multi-syringe printing module 500 inside the printing chamber 100.

FIG. 14 is a view for describing a center unit according to one embodiment of the present invention. The center unit includes an ultrasonic level sensor 710, an ultraviolet (UV) curing machine 720, and a high magnification camera module 730.

The ultrasonic level sensor 710 is used to measure a leveling offset value of the output plate 201 provided in the bed 200. The ultrasonic level sensor 710 is set based on an origin position of the bed 200.

The control unit 900 sets an output reference height in consideration of a thickness, that is, a height of the output plate. The output reference height is a height of a floor surface from which an output object is output, and movement of a nozzle in the Z direction of the printing module is controlled based on the height of the floor surface.

However, when the bottom surface height of the output plate 201 mounted on the bed 200 is different from the set output reference height, or the bottom surface of the output plate is not flat, curved, or is not horizontal, a degradation of output quality can occur.

The ultrasonic level sensor 710 scans the bottom surface of the output plate to measure an actual height of the bottom surface of the output plate. The actual height of the bottom surface is mapped by the ultrasonic level sensor 710. The control unit 900 calculates the leveling offset value by comparing a profile of the measured actual height of the bottom surface of the output plate for output with the set output reference height, and corrects the set output reference height by applying the calculated offset value. The output may be made with respect to the corrected output reference height.

The ultrasonic level sensor 710 is set based on the origin position of the bed 200.

The UV curing machine 720 allows UV curing that requires UV curing to be performed on the corresponding layer when outputting biomaterials and other photocurable materials. It is possible to perform UV curing for each layer by the UV curing machine.

The high magnification camera module 730 functions as a microscope to externally monitor the output and the growth of biological tissue or the like output to the output plate 201 even in a state in which the printing chamber 100 is not open. The high magnification camera module 730 is connected to an externally installed monitoring system to allow microscopic observation from outside and remote locations through a monitor or an app.

FIG. 15 is a flowchart for describing a control method of the three-dimensional bioprinter according to one embodiment of the present invention.

As illustrated in FIG. 15, the control method of the three-dimensional bioprinter according to the embodiment of the present invention includes a nozzle end alignment operation S100, an output plate installation operation S200, a sterilization operation S300, an output reference height correction operation S400, an output operation S500, and a $CO_2$ incubating operation S600.

The nozzle end alignment operation proceeds after output preparation work is performed.

The output preparation work includes preliminary work performed in a conventional three-dimensional bioprinter. For an output of a three-dimensional printer, a three-dimensional (3D) modeling file is made by modeling the output, and the 3D file is converted into a G-code file and then input to the control unit of the three-dimensional printer. In addition, materials used and an output method of the result are selected, and a prepared nozzle progress path is made, written as a G-code file, and input to the three-dimensional printer.

Thereafter, the case door and the door are opened, and the single printing module and syringe suitable for the output are installed. As a single printing module, an extruder module and a hot-melting module may be mounted. Moreover, the syringe holder cover is opened in each syringe holder, and the syringe containing the selected bio-ink (fluid biomaterial) is mounted on the syringe holder. The NFC tag on which the output condition is recorded is attached to each syringe.

According to the embodiment of the present invention, after such output preparation work is performed, the nozzle end alignment operation S100 is performed.

FIG. 16 is a view for describing the nozzle end alignment operation according to one embodiment of the present invention, and FIG. 16 illustrates a fork sensor installed on the bed 200. According to the present invention, a fork sensor is used as a nozzle end alignment sensor 250.

The nozzle end alignment operation S100 includes (a) an operation of mounting a nozzle end alignment sensor at a predetermined position of the bed in the printing chamber and positioning a sensing point of the nozzle end alignment sensor at a bed origin position, (b) an operation of moving the nozzle end alignment sensor to one side in the X-axis direction to locate the sensing point of the nozzle end alignment sensor below the nozzle of the single printing module, (c) an operation of lowering the single printing module to measure a Z value of an nozzle end of the single printing module, (d) an operation of positioning the single printing module at an original position thereof and moving the nozzle end alignment sensor to the other side in the X-axis direction to locate the sensing point of the nozzle end alignment sensor below the syringe at the output position of the multi-syringe printing module, (e) an operation of lowering the multi-syringe printing module to measure a Z value of the nozzle end of the syringe located at the output position of the multi-syringe printing module, and (f) an operation of repositioning the multi-syringe printing module and moving the bed to the origin position thereof.

In the nozzle end alignment operation S100, each nozzle end of printing modules is measured using the nozzle end alignment sensor 250 mounted at a predetermined position of the bed 200 in the printing chamber 100. This is an operation to measure and align the nozzle end of the extruder module or hot-melting module selected as the single printing module and the nozzle end of each syringe installed in the multi-syringe printing module.

When setting the single printing module 400 and the multi-syringe printing module 500, the nozzle of each printing module is set to have a predetermined (X,Y) position. When the bed origin position is set to (0,0), the nozzle position of the single printing module 400 is set to (X1,0), and the position of the syringe nozzle at the output position of the multi-syringe printing module is set to (X2,0).

The nozzle end alignment operation S100 is performed to measure each nozzle end in a state in which the single printing module 400 and the multi-syringe printing module are set as described above.

The sensing point of the nozzle end alignment sensor 250 is located at a predetermined initial origin position on the bed 200, that is, a position set as a (0,0) position on the XY coordinate system. The position at this time is referred to as the bed origin position.

Thereafter, the bed 200 moves to one side in the X-axis direction to locate the sensing point of the nozzle end alignment sensor 250 below the nozzle (X1,0) of the single printing module.

Thereafter, the single printing module 400 is lowered, and the Z value of the nozzle end of the single printing module 400 is measured in terms of the lowered distance. When the Z value of the nozzle end of the single printing module 400 is referred to as a Z1 value, the measured Z value of the nozzle end of the single printing module 400, that is, the Z1 value, is input to the control unit. Based on the input Z1 value, a Z-axis movement of the single printing module 400 is controlled.

Thereafter, the first printing module 400 is returned to the original position, and the bed 200 is moved to the other side in the X-axis direction to return to the bed origin position. The sensing point of the nozzle end alignment sensor 250 is located below the nozzle (X2,0) of the first syringe located at the output position in the multi-syringe printing module 500 by further moving the bed from the bed origin position to the other side in the X-axis direction. In a state before the output is performed, the first syringe is set to be located at the output position of the multi-syringe printing module.

The first syringe holder is lowered from the standby height to the output start height, the multi-syringe printing module is lowered, and the Z value of the nozzle end of the first syringe converted from the lowered distance is measured. When the Z value of the nozzle end of the first syringe is referred to as a Z21 value, the measured Z value of the nozzle end of the first syringe, that is, the Z21 value, is input to the control unit. Based on the input Z21 value, the Z-axis movement of the first syringe of the multi-syringe printing module is controlled.

Thereafter, the first syringe is raised, the rotary shaft is rotated to move the second syringe to the output position, and the Z value of the nozzle end of the second syringe is measured in the same way. When the Z value of the nozzle end of the second syringe is referred to as a Z22 value, the measured Z value of the nozzle end of the second syringe, that is, the Z22 value, is input to the control unit. Based on the input Z22 value, the z-axis movement of the second syringe of the multi-syringe printing module is controlled.

Then, in the same way, the Z value of the nozzle end of the third syringe, the Z value of the nozzle end of the fourth syringe, and the Z value of the nozzle end of the fifth syringe are measured, and a Z23 value, a Z24 value, and a Z25 value are input to the control unit.

As described above, the syringe for which the Z value of the nozzle end is measured for the first time is set as the first syringe, the rotary shaft moves each syringe holder to the output position while repeating forward and backward rotations within the range of the rotation angle of 180° in clockwise and counterclockwise directions, and the Z value of the nozzle end of each syringe is measured.

After the Z value of the nozzle end of each syringe is measured, the first syringe returns to the output position, and the bed 200 returns to the bed origin position. The nozzle end alignment sensor 250 is then removed.

Thereafter, in an output plate installation operation S200, the output plate 201 is installed on the bed 200.

The output plate 201 is fixed at the set position of the bed 200, the case door 12 and the chamber door 110 are closed, and the inside of the printing chamber 100 is isolated from the outside thereof.

Thereafter, the sterilization operation S300 is performed. $H_2O_2$ gas is introduced into the printing chamber 100 through the sterilizing gas inlet 162 to perform sterilization, and after plasma $H_2O_2$ sterilization, ventilation is performed to discharge $H_2O_2$ gas to the outside.

Thereafter, the output reference height correction operation S400 is performed.

The ultrasonic level sensor 710 installed in the center module 700 in the printing chamber performs an operation of scanning the bottom surface of the output plate 201 to measure the actual height of the bottom surface of the output plate 201. Moreover, the control unit 900 performs an operation of comparing the measured profile of the actual height of the bottom surface of the output plate 201 with the set output reference height to calculate the leveling offset value. Thereafter, an operation of correcting the set output reference height by applying the calculated offset value is performed. By performing such an output reference height correction operation, the output may be performed by the corrected output reference height.

Thereafter, an output operation S500 in which the output is made by the single printing module and the multi-syringe printing module is performed.

The bed 200 moves to the lower side of the single printing module 400, and the nozzle of the single printing module on the output plate 201 outputs structures such as a scaffold, a drug structure, and a frame structure while moving in a set path.

Thereafter, the bed 200 moves to the lower side of the multi-syringe printing module 500, and the selected syringe of the multi-syringe printing module 500 on the output plate 201 moves to the output position. When the syringe of the number selected in the multi-syringe printing module 500 moves to the output position, the NFC reader 750 reads the NFC tag 610 of the syringe. According to the read output condition, the control unit 900 controls the set output temperature condition by driving the heating element and the cooling unit provided in the syringe holder 540. Thereafter, the output is made in accordance with output conditions such as an output speed and an air pressure recorded in the NFC tag 610 of the syringe 600. At the output position, the syringe performs the output in a state where the syringe is lowered from the standby height to the output start height, and the bio-ink output in the syringe is made in an air dispensing method by the air pressure supplied through the air pipe.

When curing of a specific layer output during the output operation is required, after outputting the corresponding layer, the bed 200 moves to the bed origin position, and the output is exposed to UV light provided by the UV curing machine 720 to be cured.

According to the embodiment of the present invention, the $CO_2$ incubation may be performed without stopping after the output is completed.

The $CO_2$ incubating operation S600 is performed by controlling the concentration of carbon dioxide in the printing chamber by the $CO_2$ introduced through the incubating gas inlet, and controlling the temperature and humidity through the temperature control unit and the humidity control unit.

During the output operation S500 and the $CO_2$ incubating operation S600, if necessary, a cell formation observation may be performed using the high magnification camera 730 installed in the center module 700, and shooting and recording a video are possible.

Thereafter, when it is finally determined to be complete, the device operation is stopped, the case door and the chamber door are opened, and the output is recovered.

The invention claimed is:

1. A three-dimensional bioprinter comprising: a case; a printing chamber provided inside the case and formed to be surrounded by wall surfaces so that an inside of the printing chamber is isolable from an outside thereof and having a chamber door; a multi-syringe printing module including a hollow cylinder portion fixed into an opening of an upper surface of the printing chamber and having an open upper end and an open lower end, a packing plate installed inside the cylinder portion to separate the cylinder portion into an upper zone and a lower zone isolated from each other, a rotary shaft having one end fixed to the packing plate and extending upward, a plurality of syringe holders disposed below the packing plate in a circumferential direction so that syringes are mounted thereon, a syringe holder support portion configured to support the syringe holder below the packing plate, the syringe holder support portion includes: a syringe holder moving shaft having a lower end fixed to the syringe holder and extending upward through the packing plate, the syringe holder moving shaft being height adjustable, and a rotary shaft driving unit configured to rotate the rotary shaft so that the syringe holder selected from the plurality of syringe holders is rotated to an output position; and a lift up/lift down unit having a vertical movement unit disposed outside the printing chamber and connected to the syringe printing module to control lift up/lift down of the syringe printing module.

2. The three-dimensional bioprinter of claim 1, comprising a rotary shaft support portion configured to rotatably support the rotary shaft,
wherein the rotary shaft driving unit includes a support of which one end is fixed to the rotary shaft support portion and the other end is fixed to the vertical movement unit, an encoder motor configured to rotate the rotary shaft, and a potentiometer mounted on the support,
a pulley is formed at each of an end portion of the rotary shaft, an end portion of the potentiometer, and an end portion of the encoder motor, and
timing belts are formed between the pulley of the end portion of the rotary shaft and the pulley of the end portion of the potentiometer and between the pulley of the end portion of the potentiometer and the pulley of the end portion of the encoder motor.

3. The three-dimensional bioprinter of claim 1, wherein the cylinder portion is formed of a rigid material, and an outer peripheral surface of the packing plate is in contact with an inner peripheral surface of the cylindrical portion so that the packing plate is rotatable and raisable/lowerable.

4. The three-dimensional bioprinter of claim 1, wherein the syringe holder support portion includes: a fixing guide fixed to an upper surface of the packing plate so that the syringe holder moving shaft passes through the fixing guide; a moving guide fixed to an upper portion of the syringe holder moving shaft to be raised/lowered together with the syringe holder moving shaft; a spring configured to move the moving guide upward when an external force for lowering the moving guide is not applied; and a syringe holder lift up/lift down drive unit configured to push the moving guide and move the syringe holder moving shaft from a standby height to an output start height when the rotary shaft rotates and the syringe holder selected to perform an output operation moves to a set output position.

5. The three-dimensional bioprinter of claim 4, wherein the syringe holder lift up/lift down drive unit includes a cam drive motor fixed to a bracket fixed to the rotary shaft support portion and a cam driven by the cam drive motor to lower the moving guide of the syringe holder located at the output position, and
the syringe holder lift up/lift down drive unit further includes a detection unit configured to detect that the selected syringe holder moves to the output position.

6. The three-dimensional bioprinter of claim 5, wherein the detection unit includes:
a magnet attached to the moving guide; and
a magneto-resistive (MR) sensor installed in a bracket fixed to the rotary shaft support portion and configured to detect a magnet attached to the moving guide of the syringe holder moving to the output position.

7. The three-dimensional bioprinter of claim 1, wherein a tag on which an output condition including a temperature condition is recorded is attached to each syringe mounted on the syringe holders, and
a reader that reads the tag in a non-contact manner is provided inside the printing chamber.

8. The three-dimensional bioprinter of claim 7, wherein the syringe holder includes:
a syringe holder body including a seating groove in which the syringe is mounted, a heating element disposed in the seating groove, and a cooling block provided on an outer surface thereof; and
a syringe holder cover installed to open or close the syringe holder body in a hinge manner.

9. The three-dimensional bioprinter of claim 8, wherein a Peltier element for cooling the heating element to face the heating element is installed in the syringe holder body, and the cooling block is coupled to the Peltier element and includes a through hole through which a cooling water pipe provided to pass through the packing plate passes, and
a reading window located to correspond to a tag attachment position to read the tag, which is attached to the syringe mounted inside the syringe holder cover, from an outside is formed in the syringe holder cover.

10. The three-dimensional bioprinter of claim 8, wherein the tag includes a near field communication (NFC) tag, and the reader includes an NFC reader.

11. The three-dimensional bioprinter of claim 1, wherein the syringe holders are installed as N (N is a natural number greater than or equal to three) syringe holders, and a syringe holder located at the output position in a state where the rotary shaft is set is defined as a first syringe holder, and forward/rearward rotation of the rotary shaft is controlled at a rotation angle of 180° or less in clockwise and counterclockwise directions while a position of the first syringe holder is set to 0°.

* * * * *